US008637784B2

(12) United States Patent
Ota et al.

(10) Patent No.: US 8,637,784 B2
(45) Date of Patent: Jan. 28, 2014

(54) METHOD FOR IMPROVING RESIDUAL STRESS IN TUBULAR BODY

(75) Inventors: Takahiro Ota, Takasago (JP); Kazuhiko Kamo, Takasago (JP); Itaru Muroya, Takasago (JP); Seiji Asada, Kobe (JP); Kazuhiro Wakabayashi, Kobe (JP); Koji Okimura, Kobe (JP); Hironori Onitsuka, Kobe (JP)

(73) Assignees: Mitsubishi Heavy Industries, Ltd., Tokyo (JP); The Japan Atomic Power Company, Tokyo (JP); Hokkaido Electric Power Company, Inc., Sapporo-shi, Hokkaido (JP); Tohoku Electric Power Co., Inc, Sendai-shi, Miyagi (JP); The Tokyo Electric Power Co., Inc, Tokyo (JP); Chubu Electric Power Co., Inc, Nagoya-shi, aichi (JP); Hokuriku Electric Power Company, Toyama (JP); The Kansai Electric Power Co., Inc, Osaka (JP); The Chugoku Electric Power Co., Inc, Hiroshima (JP); Shikoku Electric Power Co., Inc, Takamatsu-shi, Kagawa (JP); Kyushu Electric Power Co., Inc, Fukuoka (JP); Electric Power Development Co., Ltd, Tokyo (JP)

( * ) Notice: Subject to any disclaimer, the term of this patent is extended or adjusted under 35 U.S.C. 154(b) by 1049 days.

(21) Appl. No.: 12/521,657

(22) PCT Filed: Jan. 11, 2008

(86) PCT No.: PCT/JP2008/050281
§ 371 (c)(1),
(2), (4) Date: Aug. 13, 2009

(87) PCT Pub. No.: WO2008/084855
PCT Pub. Date: Jul. 17, 2008

(65) Prior Publication Data
US 2010/0326974 A1      Dec. 30, 2010

(30) Foreign Application Priority Data

Jan. 12, 2007   (JP) ................................. 2007-004476

(51) Int. Cl.
*B23K 9/028*           (2006.01)

(52) U.S. Cl.
USPC ................... 219/60 A; 219/59.1; 219/121.81; 219/121.6

(58) Field of Classification Search
USPC .................. 219/60 A, 59.1, 121.81, 121.6
See application file for complete search history.

(56) References Cited

FOREIGN PATENT DOCUMENTS

EP       1772526 A1    4/2007
JP       57-070095 A   4/1982

(Continued)

OTHER PUBLICATIONS

International Search Report of PCT/JP2008/050281, Mailing Date of Apr. 8, 2008.

(Continued)

*Primary Examiner* — David Vu
*Assistant Examiner* — Brandon Fox
(74) *Attorney, Agent, or Firm* — Westerman, Hattori, Daniels & Adrian, LLP

(57) ABSTRACT

An object is to provide a method and an apparatus for improving a residual stress in a tubular body, which are enabled to improve the residual stress reliably by clearly defining controlling rage for treatment conditions without depending on an installation state and configuration of the tubular body. When a cylindrical tubular body (2) is improved in its residual stress by locally irradiating an outer-circumferential surface of a welded portion (C) of the tubular body (2) with laser beams (5a) and by moving an irradiation area (s) in an circumferential direction, a plurality thermocouples (9) are installed on the tubular body (2) to be improved, a temperature history of the outer surface of the tubular body (2) by the irradiation of the laser beam (5a) is managed by measuring the temperature history itself.

24 Claims, 25 Drawing Sheets

(56) References Cited

FOREIGN PATENT DOCUMENTS

| | | |
|---|---|---|
| JP | 62-211325 A | 9/1987 |
| JP | 2-030716 A | 2/1990 |
| JP | 08-005773 A | 1/1996 |
| JP | 10-272586 A | 10/1998 |
| JP | 2000-254776 A | 9/2000 |
| JP | 2001-150178 A | 6/2001 |
| JP | 2003-004890 A | 1/2003 |
| JP | 2004-130314 A | 4/2004 |
| JP | 2005-232586 A | 9/2005 |
| JP | 2005232586 A * | 9/2005 |
| JP | 2006-015399 A | 1/2006 |
| JP | 2006-037199 A | 2/2006 |
| JP | 2006-45598 A | 2/2006 |

OTHER PUBLICATIONS

Decision to Grant a Patent dated Jan. 15, 2013, issued in corresponding Japanese Patent Application No. 2007-004476, with English translation (5 pages).

* cited by examiner

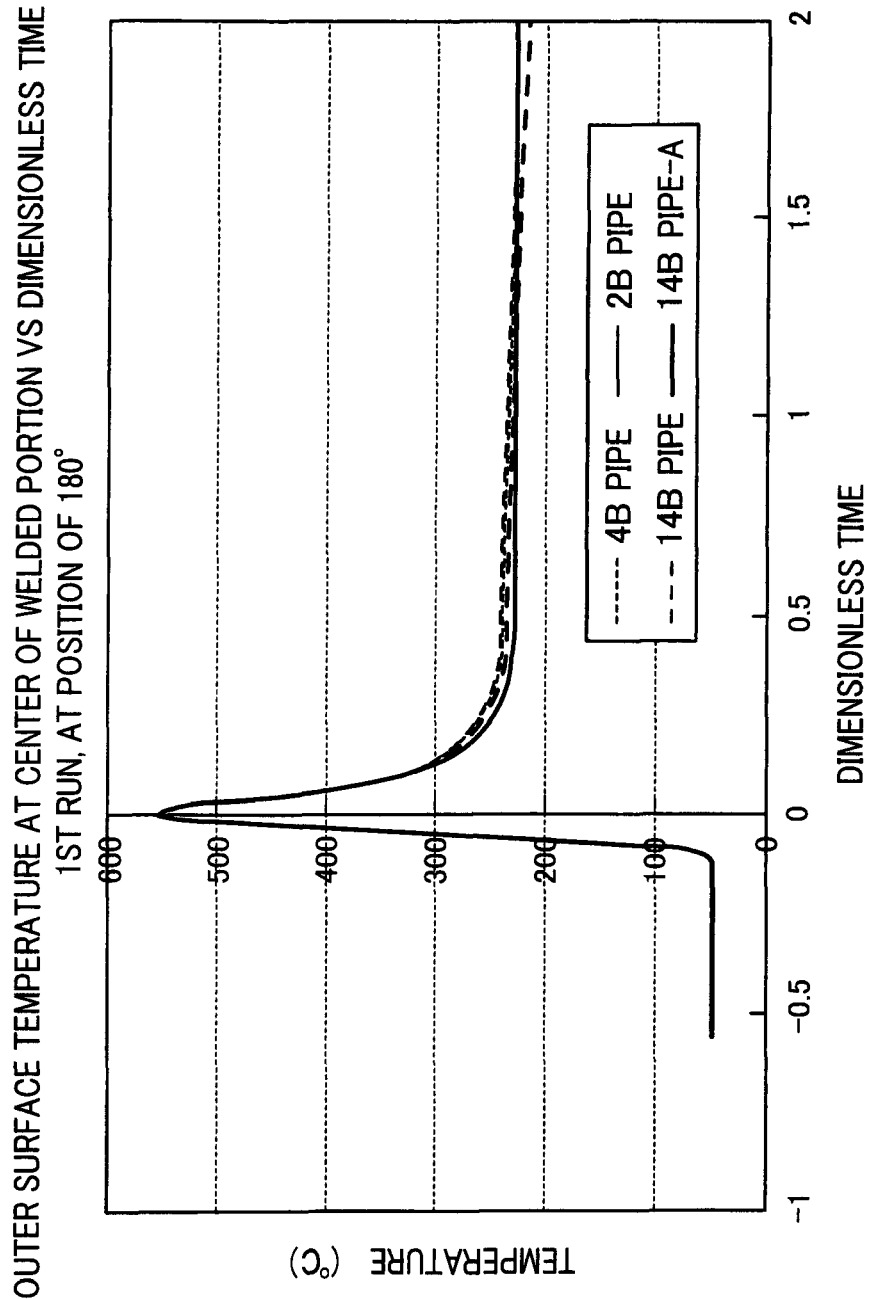

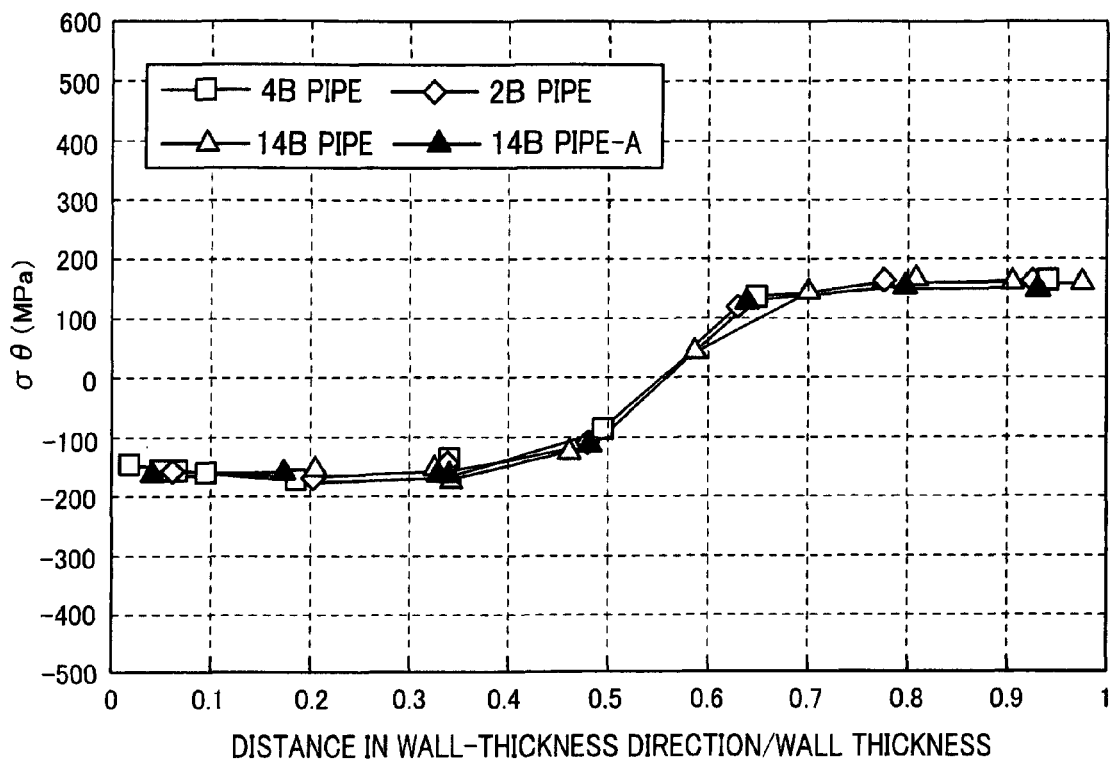

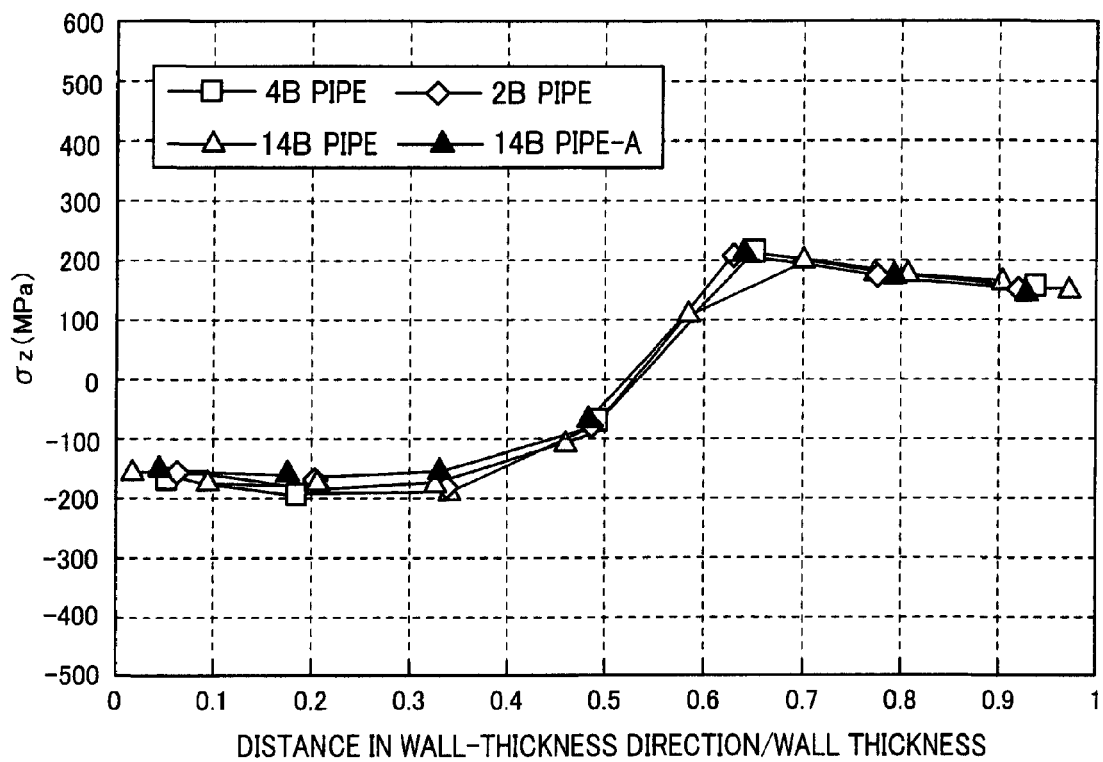

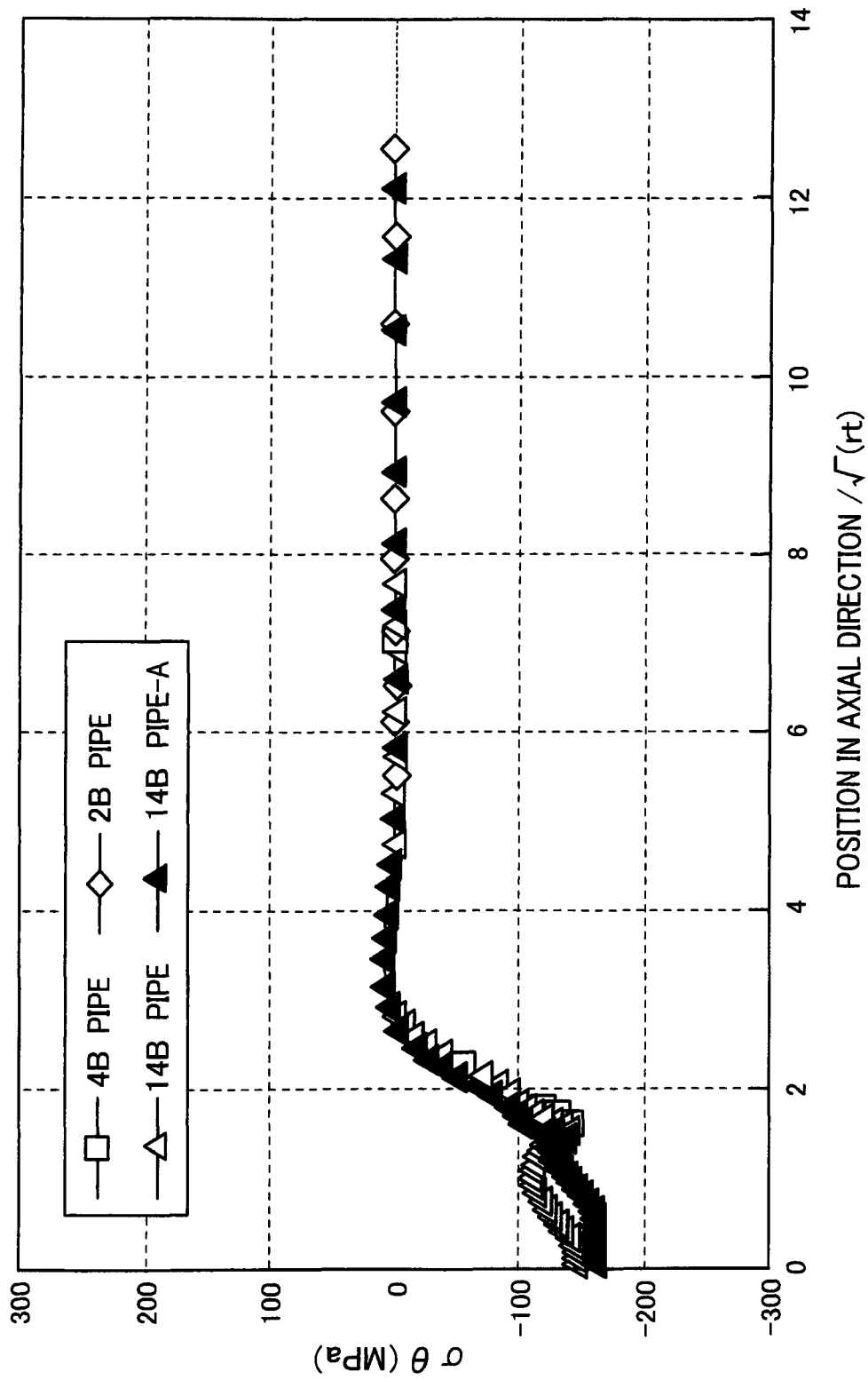

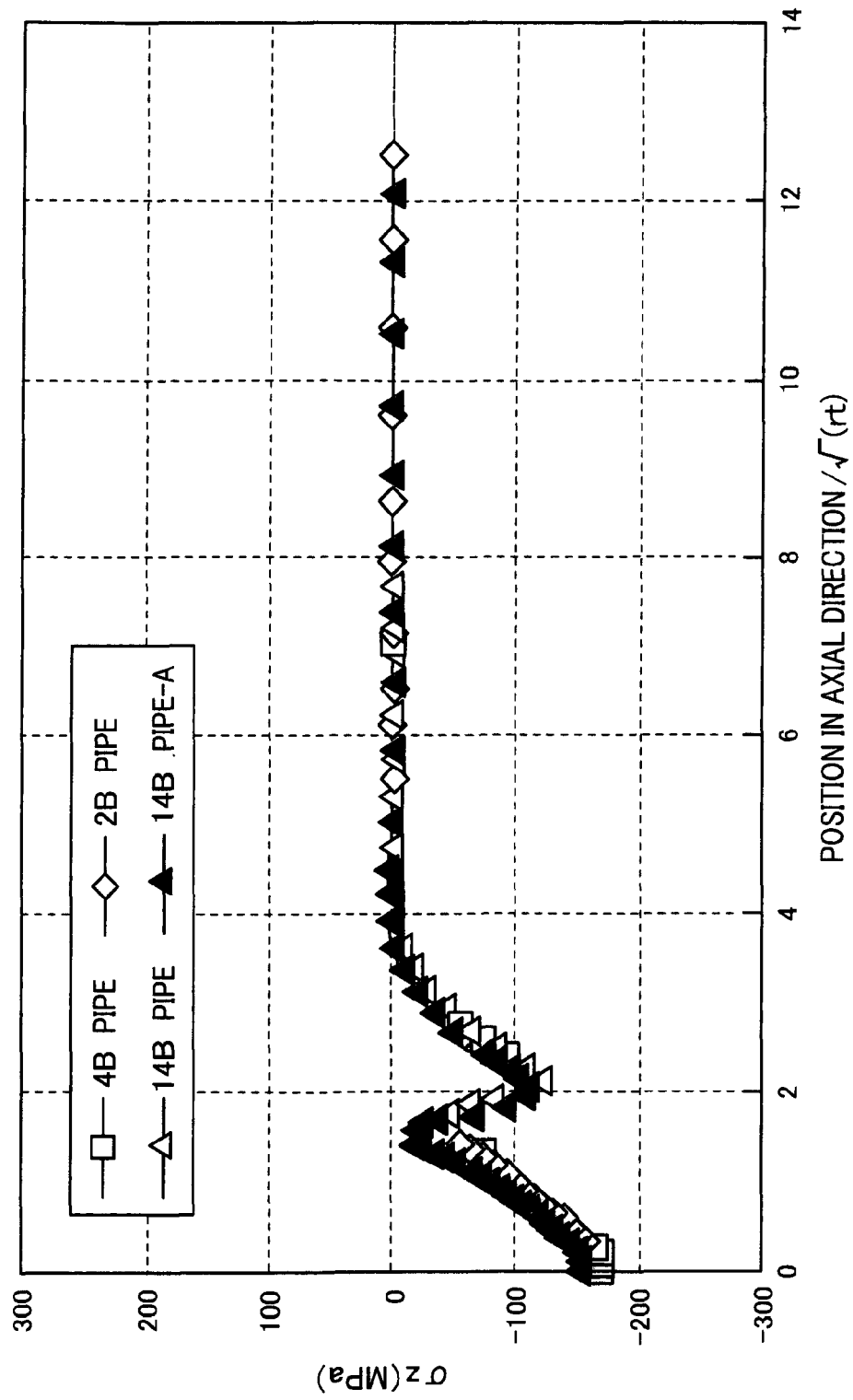

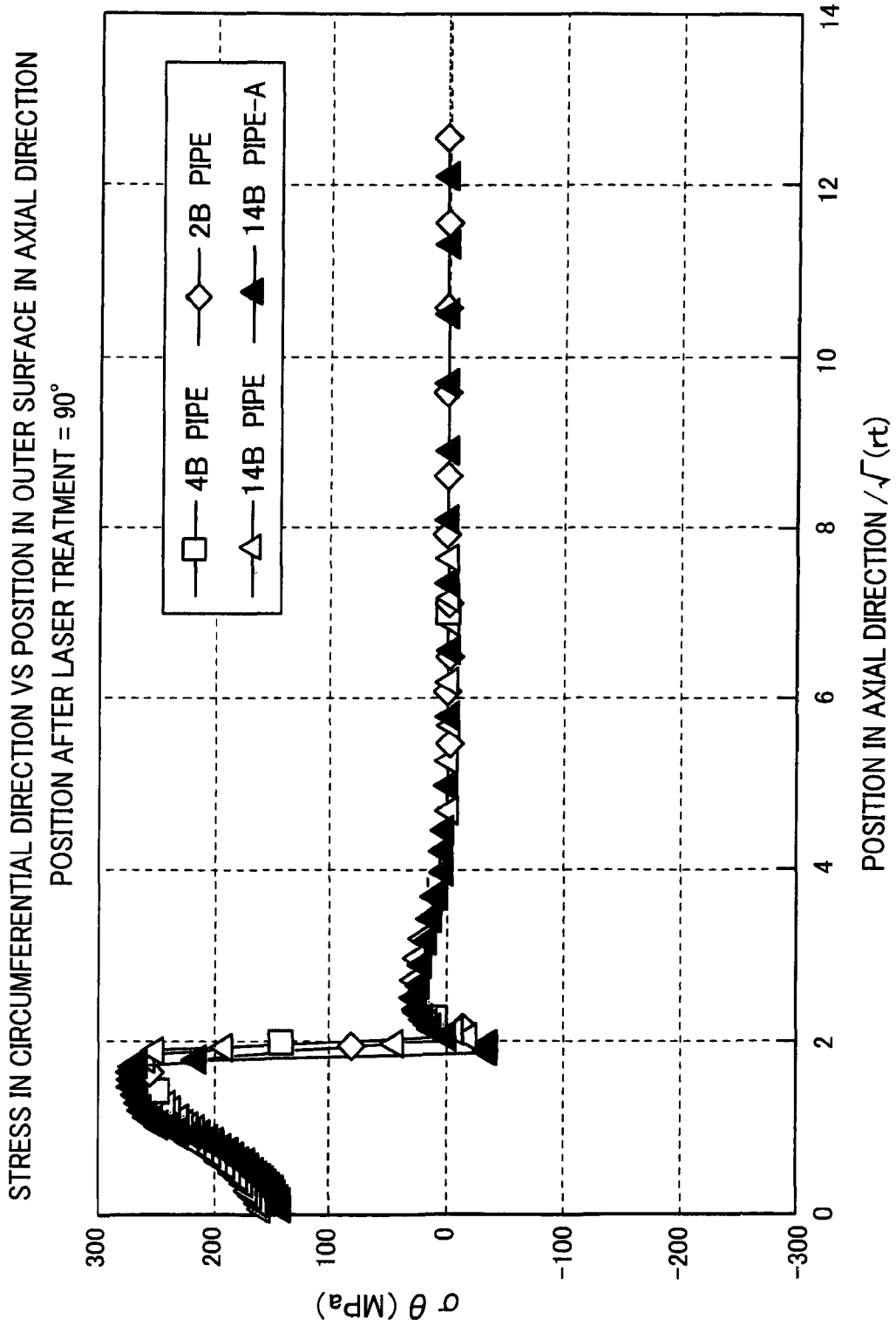

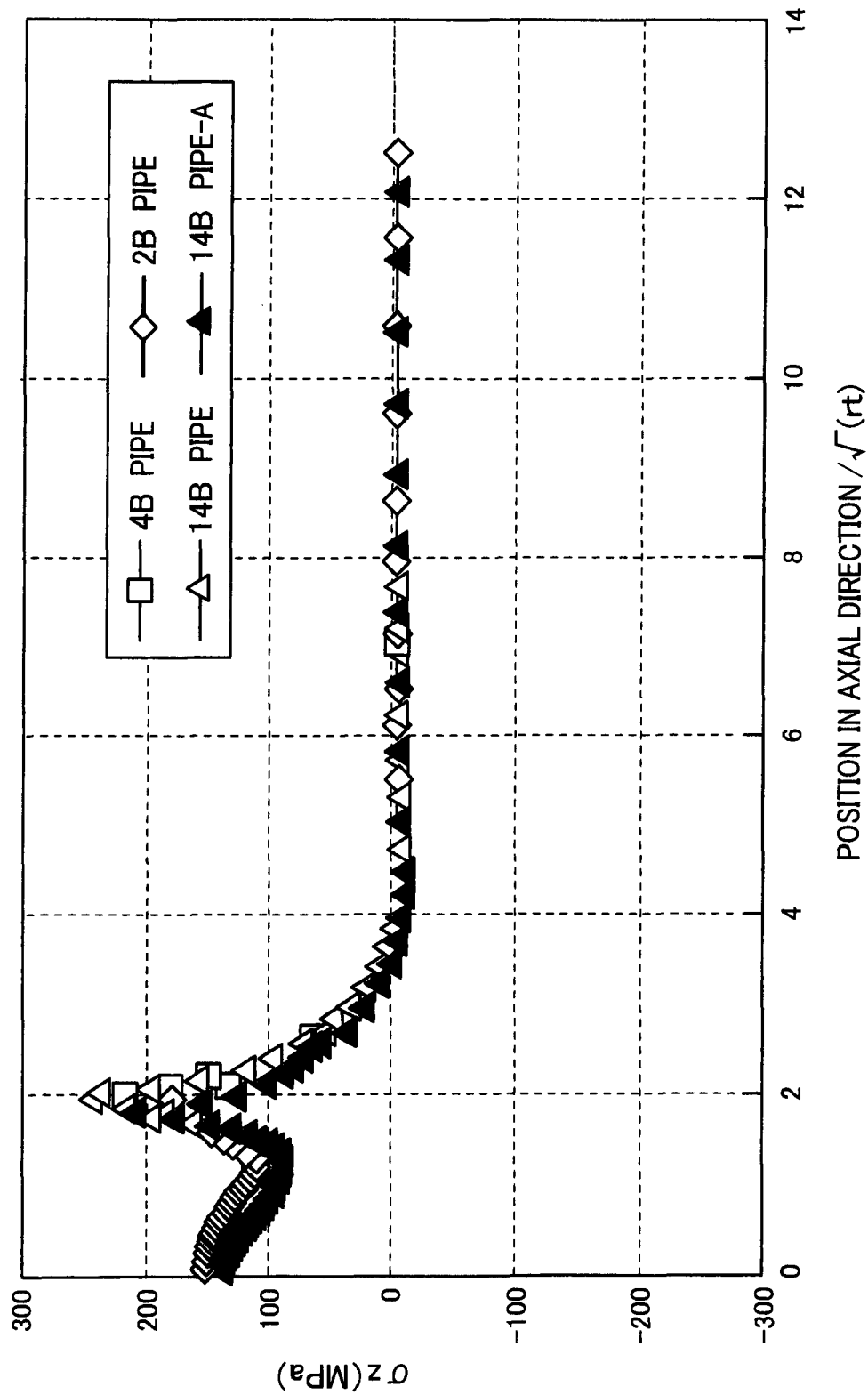

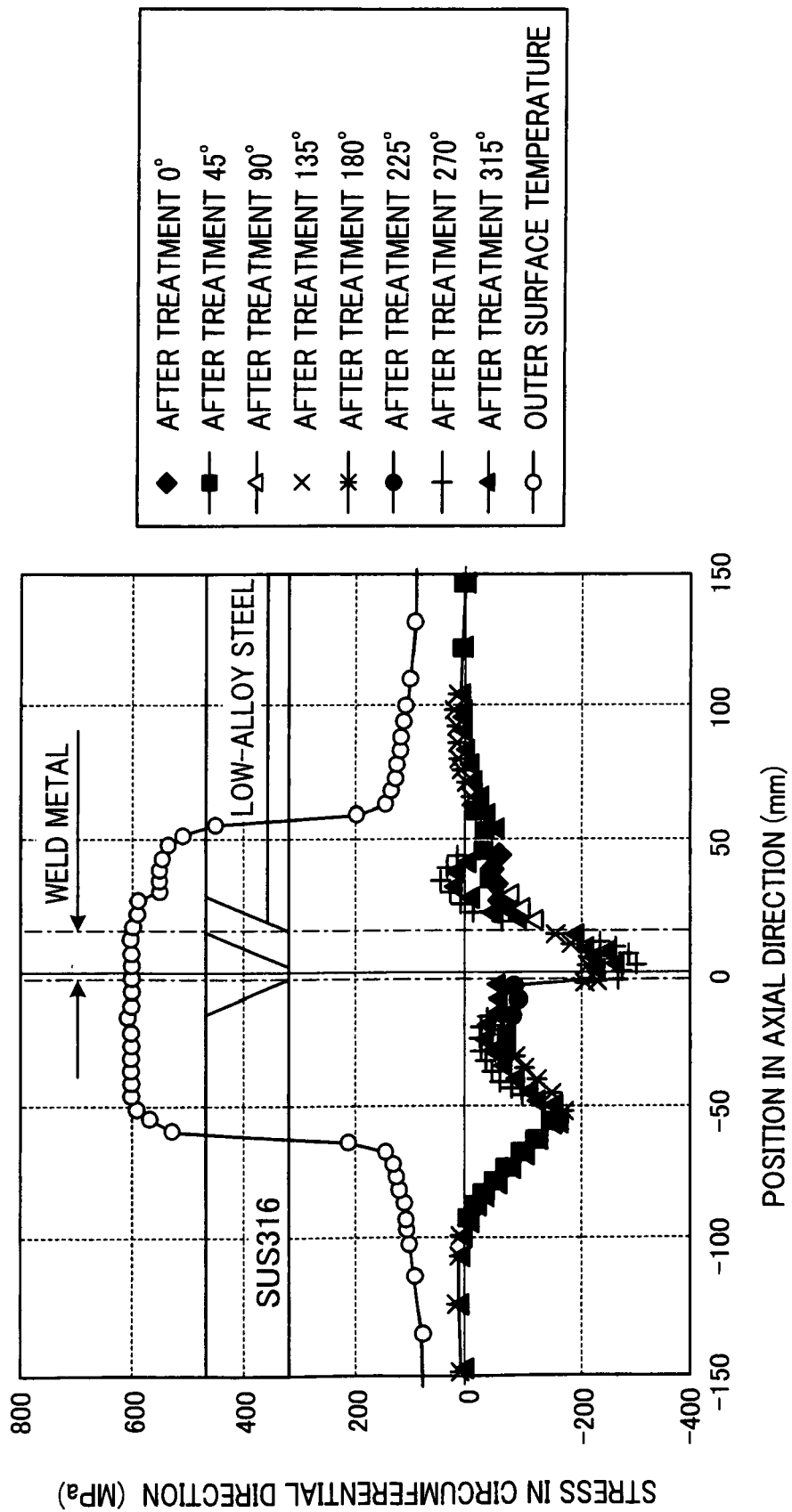

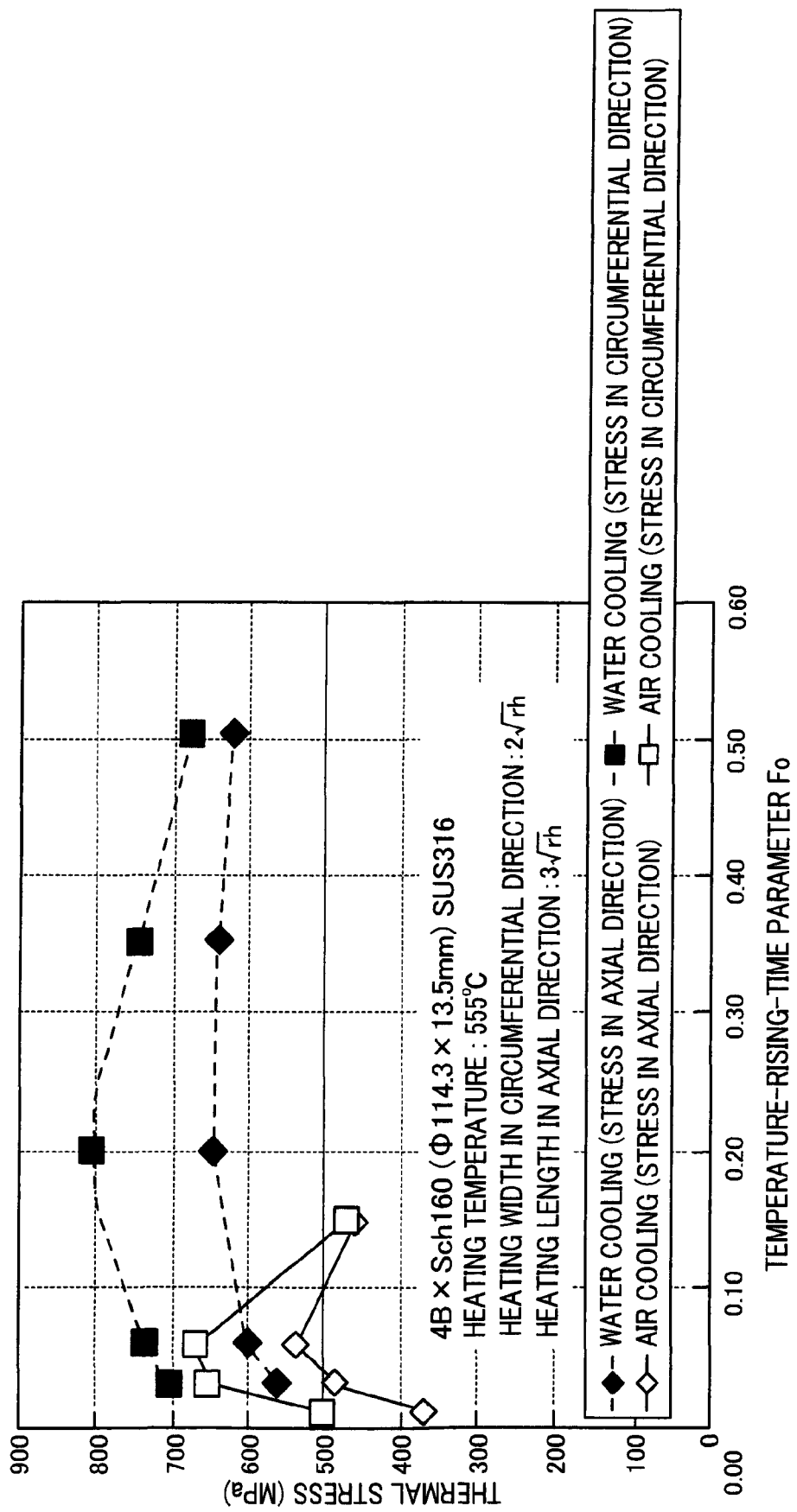

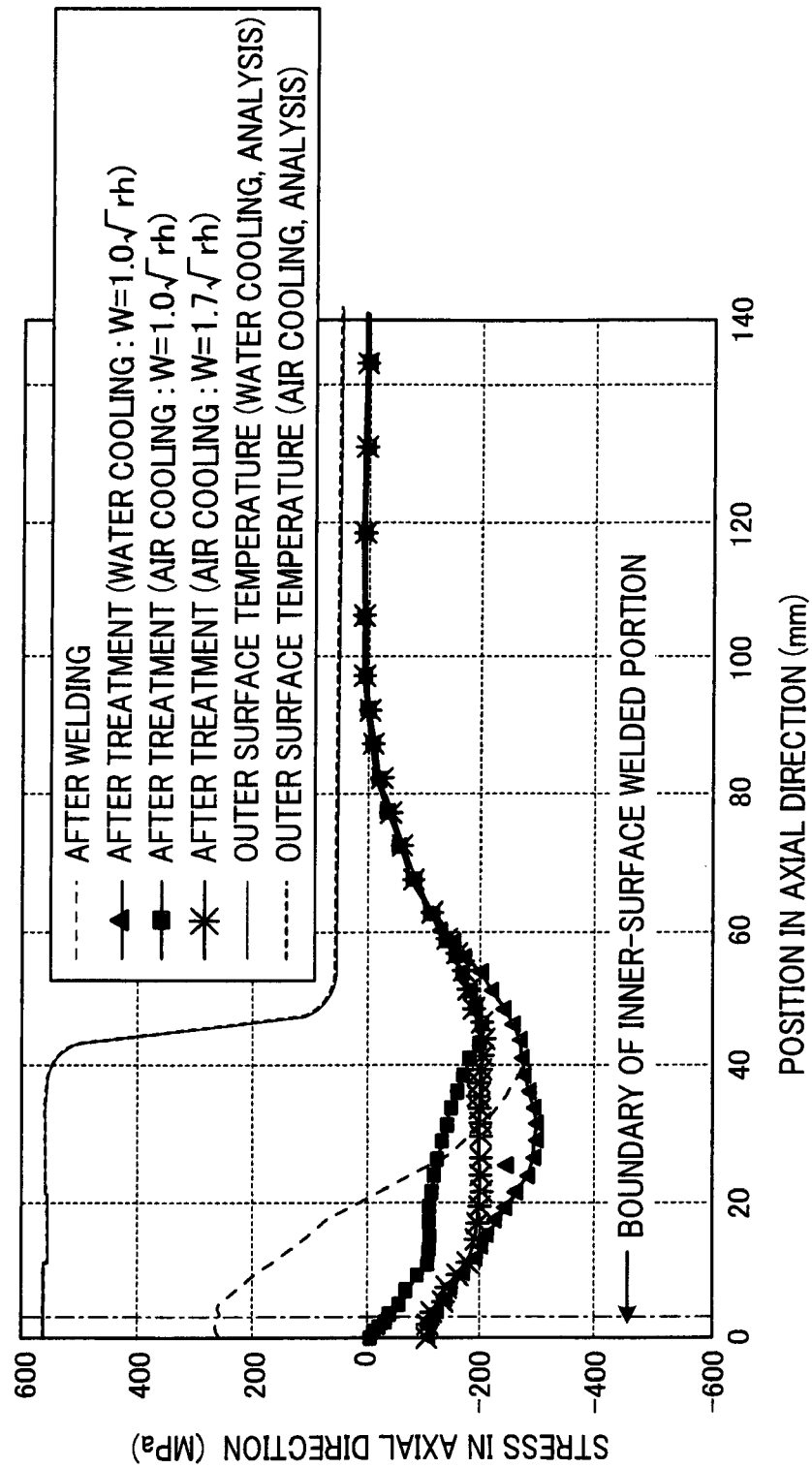

METHOD FOR IMPROVING RESIDUAL STRESS IN TUBULAR BODY

TECHNICAL FIELD

The present invention relates to a tubular-body residual-stress improving method for improving residual stress in a tubular body such as a pipe.

BACKGROUND ART

In the installation of a tubular body, such as a large pipe, in such facilities as nuclear power plants and large-scale plants, a problem is tensile stress remaining in the pipe after welding. Welding causes residual tensile stress in the inner surface of a pipe, and the residual tensile stress may possibly shorten the life of the pipe. For this reason, it is desirable that such residual stress caused by welding be improved so as to be turned to compressive stress.

An induction heating stress improvement process (hereinafter, referred to as an IHSI process) is proposed as a method for improving residual tensile stress in a pipe. The IHSI process is carried out as follows. Firstly, while the inner surface of a pipe is forcibly cooled by running water, the temperature of the pipe is raised by being inductively heated from the outer-surface side using a high-frequency induction heating coil. The pipe thus heated has a temperature gradient in the wall-thickness direction near a part satisfying stress corrosion cracking (hereinafter, referred to as SCC) conditions of the pipe. Thereafter, the heating of the pipe is stopped, but the cooling continues by running the water along the inner surface until the pipe has a substantially uniform temperature in the wall-thickness direction of the pipe. As a result, residual stress that has been tensile around the welded part is reduced or is turned to be compressive (see Patent Documents 1 to 3).

The following are some of the other methods proposed for improving residual tensile stress in a pipe. In a method, a surface of a pipe made of, for example, a stainless steel is heated to the solution heat-treatment temperature, or alternatively is melted by laser irradiation so that the residual stress in the backside surface of the pipe can be reduced. In another method of reducing residual stress, a pipe is heated by linearly irradiating the outer surface of the pipe with laser beams while the laser is rotationally moved (see Patent Documents 4 to 8).
Patent Document 1: JP-A-57-70095
Patent Document 2: JP-A-2001-150178
Patent Document 3: JP-A-10-272586
Patent Document 4: JP-A-2003-004890
Patent Document 5: JP-A-8-5773
Patent Document 6: JP-A-2000-254776
Patent Document 7: JP-A-2004-130314
Patent Document 8: JP-A-2005-232586

DISCLOSURE OF THE INVENTION

Problems to be Solved by the Invention

In the IHSI process, when the heating is finished, the temperature of the outer-circumferential surface of the pipe has to differ from that of the inner-circumferential surface thereof by at least a certain predetermined value. Accordingly, when a pipe has been already installed and thus the inside of the pipe can be cooled down by running water, the pipe can easily be treated by the IHSI process. In contrast, when it is impossible to keep water running inside a pipe, it is difficult to treat the pipe by the IHSI process. In addition, in the high-frequency induction heating that is performed in the IHSI process so as to produce a temperature gradient in the wall-thickness direction of the pipe, the depth and area of heat transmission vary depending on the material properties (dielectric constants) of the pipe heated by the high-frequency induction coil. For this reason, it is difficult to limit the area that is to be heated. Moreover, the heating by use of the high-frequency induction coil requires a large-sized system that consumes a large amount of energy. Furthermore, in a case of heating a portion including members made of different materials and thus different dielectric constants, such as a dissimilar joint, it is difficult to provide a constant temperature gradient in the wall-thickness direction.

In addition, insufficient or excessive heating may possibly occur by the method in which a surface of a pipe made of, for example, a stainless steel is heated to the solution heat-treatment temperature, or alternatively is melted by laser irradiation in order to reduce the stress in the backside surface. Excessive heating causes an area near the heated part to be exposed to a sensitizing temperature, and is thus harmful to the material of the pipe itself. Besides, excessive heating is a cause of oxidation scales that are to be formed in the heated surface. The oxidation scales, if formed, need to be removed. A work to remove the scales, if performed in a nuclear power plant, may increase the possibility that the workers might be exposed to radiation. With insufficient heating, on the other hand, the residual stress cannot be improved to a satisfactory extent, and thus the SCC cannot be precluded completely. Moreover, in a case of heating a portion including members made of different materials, such as a stainless steel and a low-alloy steel, the improvement in the stainless-steel material properties (non-sensitizing temperature: 1050° C. or higher) negatively affects the material properties of the low-alloy steel (hardening and decrease in the toughness caused by quenching). Accordingly, the method cannot be applied to a dissimilar joint.

In addition, in the method of reducing residual stress by heating a pipe by laser irradiation, that is, by linearly irradiating the outer surface of the pipe with laser beams while the laser is rotationally moved, the pipe is heated with a restricted length in the axial direction of the pipe in order to restrict the area to be heated. However, to obtain compressive residual stress, restrictions have to be imposed not only on the heating length in the axial direction but also on the heating width in the circumferential direction and on the moving speed of the laser. In addition, without clearly defining how the heating width in the circumferential direction and the like should be set, there occurs a problem in that it is impossible to perform control under what conditions the treatment should be performed. Especially when there are various pipes of the target that vary from one another in the diameters, the wall thicknesses, the material properties, and other properties, the different treatment conditions are necessary. For the purpose of achieving a desired effect of improving the stress, the treatment conditions have to be controlled within the optimal range. In addition, there are no treatment conditions determined for a case where different kinds of materials such as a stainless steel and a low-alloy steel are included in the tubular body to be improved.

The present invention has been made in view of the above-described problems. An object of the present invention, therefore, is to provide a tubular-body residual-stress improving method capable of guaranteeing an improvement in residual stress in a tubular body by clearly defining controlling range for treatment conditions, without depending on an installation state and configuration of the tubular body.

Means for Solving the Problems

A first aspect of the invention for solving the above problems provides a tubular-body residual-stress improving method for improving residual stress of a cylindrical tubular body by locally irradiating an outer-circumferential surface of a welded portion of the tubular body with laser beams and by moving an irradiation area in a circumferential direction, wherein, a plurality of thermometers are installed on a tubular body to be improved, while an outer surface of the tubular body is irradiated with the laser beams, a temperature history of the outer surface is measured by the plurality of thermometers, and the temperature history thus measured is controlled.

A second aspect of the invention for solving the above problems provides a tubular-body residual-stress improving method for improving residual stress of a cylindrical tubular body by locally irradiating an outer-circumferential surface of a welded portion of the tubular body with laser beams and by moving an irradiation area in a circumferential direction, wherein, a plurality of thermometers are installed on a tubular body to be improved;

a temperature history of an outer surface of the tubular body is measured by the plurality of thermometers while the outer surface is irradiated with the laser beams;

a highest achieving temperature, a temperature-rising time required for reaching the highest achieving temperature, and a heating length in an axial direction in which the highest achieving temperature stays in a predetermined temperature range are obtained; and a heating width in the circumferential direction is controlled on the basis of a product of the temperature-rising time and a speed of moving the laser beams in the circumferential direction.

A third aspect of the invention for solving the above problems provides a tubular-body residual-stress improving method for improving residual stress of a cylindrical tubular body by locally irradiating an outer-circumferential surface of a welded portion of the tubular body with laser beams and by moving an irradiation area in a circumferential direction, wherein, preliminarily, a plurality of thermometers are installed on a different tubular body having a same condition as that of a tubular body to be improved, a temperature history of an outer surface of the different tubular body is measured by the plurality of thermometers while the outer surface is irradiated with the laser beams; a highest achieving temperature, a temperature-rising time required for reaching the highest achieving temperature, and a heating length in an axial direction in which the highest achieving temperature stays in a predetermined temperature range are obtained; then a heating width in the circumferential direction is obtained on the basis of a product of the temperature-rising time and a speed of moving the laser beams in the circumferential direction, and subsequently, when the tubular body to be improved is irradiated with the laser beams, the highest achieving temperature, the temperature-rising time, the heating length in the axial direction, and the heating width in the circumferential direction are controlled as treatment conditions.

A fourth aspect of the invention for solving the above problems provides the tubular-body residual-stress improving method according to any one of the first to the third aspect, wherein a dimensionless time $F=(\tau \times k)/h^2$ is obtained, where $\tau$ is the temperature-rising time, $k$ is a thermal diffusivity of the tubular body, and $h$ is a wall thickness of the tubular body, and the dimensionless time F is controlled as the temperature rising time.

A fifth aspect of the invention for solving the above problems provides the tubular-body residual-stress improving method according to the fourth aspect, wherein the dimensionless time F is controlled with an upper limit and a lower limit thereof.

A sixth aspect of the invention for solving the above problems provides the tubular-body residual-stress improving method according to anyone of the first to fifth aspect, wherein a dimensionless distance in the circumferential direction $G=W/\sqrt{(rh)}$ is obtained, where W is the heating width in the circumferential direction, r is an average radius of the tubular body, and h is the wall thickness of the tubular body, and the dimensionless distance G is controlled as the heating width in the circumferential direction.

A seventh aspect of the invention for solving the above problems provides the tubular-body residual-stress improving method according to the sixth aspect, wherein a lower limit of the dimensionless distance G is controlled.

An eighth aspect of the invention for solving the above problems provides the tubular-body residual-stress improving method according to any one of the first to seventh aspects, wherein a dimensionless distance in the axial direction $J=L/\sqrt{(rh)}$ is obtained, where L is the heating length in the axial direction, r is the average radius of the tubular body, and h is the wall thickness of the tubular body, and the dimensionless distance J is controlled as the heating length in the axial direction.

A ninth aspect of the invention for solving the above problems provides the tubular-body residual-stress improving method according to the eighth aspect, wherein the dimensionless distance J is controlled to be not less than 3.0.

A tenth aspect of the invention for solving the above problems provides the tubular-body residual-stress improving method according to any one of the first to ninth aspects, wherein the highest achieving temperature is controlled:

to be not lower than 550° C. and lower than 650° C. in a case where the tubular body is made of an austenitic stainless steel;

to be not lower than 550° C. and lower than 650° C. in a case where the tubular body is made of a nickel-chromium iron alloy; and to be not lower than 500° C. and lower than 595° C. in a case where the tubular body is made of any one of a low-alloy steel and a carbon steel.

An eleventh aspect of the invention for solving the above problems provides the tubular-body residual-stress improving method according to any one of the first to tenth aspects, wherein a product $(v \times h)$ is controlled to be not less than 70 mm²/s, where v is the moving speed of the laser beams and h is the wall thickness of the tubular body.

A twelfth aspect of the invention for solving the above problems provides the tubular-body residual-stress improving method according to the fourth aspect, wherein a lower limit of the dimensionless time F is controlled in a case where an inner surface of the tubular body is cooled by water.

A thirteenth aspect of the invention for solving the above problems provides the tubular-body residual-stress improving method according to the sixth aspect, wherein a lower limit of the dimensionless distance G is controlled in a case where an inner surface of the tubular body is cooled by water.

A fourteenth aspect of the invention for solving the above problems provides a tubular-body residual-stress improving apparatus including:

rotationally driving means which moves circling around an outer circumference of a cylindrical tubular body and whose speed of moving in a circumferential direction can be controlled;

an optical head which is held by the rotationally driving means, the optical head locally irradiating an outer-circumferential surface of a welded portion of the tubular body with laser beams, and being capable of adjusting an irradiation area; and regulating means which regulates the rotationally moving means and the optical head, and the apparatus improving residual stress of the tubular body by making the irradiation area of the laser beams move in the circumferential direction, wherein a plurality of thermometers are installed on a tubular body to be improved, and while an outer surface of the tubular body is irradiated with the laser beams, the regulating means makes the plurality of thermometers measure a temperature history of the outer surface, and controls the temperature history.

A fifteenth aspect of the invention for solving the above problems provides a tubular-body residual-stress improving apparatus including:

rotationally driving means which moves circling around an outer circumference of a cylindrical tubular body and whose speed of moving in a circumferential direction can be controlled;

an optical head which is held by the rotationally driving means, the optical head locally irradiating an outer-circumferential surface of a welded portion of the tubular body with laser beams, and being capable of adjusting an irradiation area; and regulating means which regulates the rotationally moving means and the optical head, and the apparatus improving residual stress of the tubular body by making the irradiation area of the laser beams move in the circumferential direction, wherein a plurality of thermometers are installed on a tubular body to be improved, and the regulating means:

makes the plurality of thermometers measure a temperature history of an outer surface of the tubular body while the outer surface is irradiated with the laser beams;

obtains a highest achieving temperature, a temperature-rising time required for reaching the highest achieving temperature, and a heating length in an axial direction in which the highest achieving temperature stays within a predetermined temperature range; and controls a heating width in the circumferential direction on the basis of a product of the temperature-rising time and a speed of moving the laser beams in the circumferential direction.

A sixteenth aspect of the invention for solving the above problems provides a tubular-body residual-stress improving apparatus including:

rotationally driving means which moves circling around an outer circumference of a cylindrical tubular body and whose speed of moving in a circumferential direction can be controlled;

an optical head which is held by the rotationally driving means, the optical head locally irradiating an outer-circumferential surface of a welded portion of the tubular body with laser beams, and being capable of adjusting an irradiation area; and regulating means which regulates the rotationally moving means and the optical head, and the apparatus improving residual stress of the tubular body by making the irradiation area of the laser beams move in the circumferential direction, wherein preliminarily, a plurality of thermometers are installed on a different tubular body having a same condition as that of a tubular body to be improved, and the regulating means:

makes the plurality of thermometers measure a temperature history of an outer surface of the different tubular body while the outer surface is irradiated with the laser beams;

obtains a highest achieving temperature, a temperature-rising time required for reaching the highest achieving temperature, and a heating length in an axial direction in which the highest achieving temperature stays within a predetermined temperature range; and obtains a heating width in the circumferential direction on the basis of a product of the temperature-rising time and a speed of moving the laser beams in the circumferential direction, and subsequently, when the tubular body to be improved is irradiated with the laser beams, the regulating means controls the highest achieving temperature, the temperature-rising time, the heating length in the axial direction, and the heating width in the circumferential direction as treatment conditions.

A seventeenth aspect of the invention for solving the above problems provides the tubular-body residual-stress improving apparatus according to any one of the fourteenth to sixteenth aspects, wherein the regulating means obtains a dimensionless time $F=(\tau \times k)/h^2$, where $\tau$ is the temperature-rising time, k is a thermal diffusivity of the tubular body, and h is a wall thickness of the tubular body, and the regulating means controls the dimensionless time F as the temperature rising time.

An eighteenth aspect of the invention for solving the above problems provides the tubular-body residual-stress improving apparatus according to the seventeenth aspect, wherein the regulating means controls the dimensionless time F with an upper limit and a lower limit thereof.

A nineteenth aspect of the invention for solving the above problems provides the tubular-body residual-stress improving apparatus according to any one of the fourteenth to eighteenth aspects, wherein the regulating means obtains a dimensionless distance in the circumferential direction $G=W/\sqrt{(rh)}$, where W is the heating width in the circumferential direction, r is an average radius of the tubular body, and h is the wall thickness of the tubular body, and the regulating means controls the dimensionless distance G as the heating width in the circumferential direction.

A twentieth aspect of the invention for solving the above problems provides the tubular-body residual-stress improving apparatus according to the nineteenth aspect, wherein the regulating means controls a lower limit of the dimensionless distance G.

A twenty-first aspect of the invention for solving the above problems provides the tubular-body residual-stress improving apparatus according to any one of the fourteenth to twentieth aspects, wherein the regulating means obtains a dimensionless distance in the axial direction J=L/√(rh) where L is the heating length in the axial direction, r is the average radius of the tubular body, and h is the wall thickness of the tubular body, and the regulating means controls the dimensionless distance J as the heating length in the axial direction.

A twenty-second aspect of the invention for solving the above problems provides the tubular-body residual-stress improving apparatus according to the twenty-first aspect, wherein the regulating means controls the dimensionless distance J so that the dimensionless distance J is not less than 3.0.

A twenty-third aspect of the invention for solving the above problems provides the tubular-body residual-stress improving apparatus according to any one of the fourteenth to twenty-second aspects, wherein the regulating means controls the highest achieving temperature:

so that the highest achieving temperature is not lower than 550° C. and lower than 650° C. in a case where the tubular body is made of an austenitic stainless steel;

so that the highest achieving temperature is not lower than 550° C. and lower than 650° C. in a case where the tubular body is made of a nickel-chromium iron alloy; and so that the highest achieving temperature is not lower than 500° C. and lower than 595° C. in a case where the tubular body is made of any one of a low-alloy steel and a carbon steel.

A twenty-fourth aspects of the invention for solving the above problems provides the tubular-body residual-stress improving apparatus according to any one of the fourteenth to twenty-third aspects, wherein the regulating means controls a product (v×h) so that the product is not less than 70 mm$^2$/s, where v is the moving speed of the laser beams and h is the wall thickness of the tubular body.

A twenty-fifth aspect of the invention for solving the above problems provides the tubular-body residual-stress improving apparatus according to the seventeenth aspect, wherein the regulating means controls a lower limit of the dimensionless time F in a case where an inner surface of the tubular body is cooled by water.

A twenty-sixth aspect of the invention for solving the above problems provides the tubular-body residual-stress improving apparatus according to the nineteenth aspect, wherein the regulating means controls a lower limit of the dimensionless distance G in a case where an inner surface of the tubular body is cooled by water.

Effects of the Invention

According to the present invention, the treatment quality can be guaranteed by means of the temperature history of the thermometers installed on the outer surface of the tubular body, so that it is not necessary to measure the distribution of the input heat density of the used laser beams. For this reason, the treatment control can be achieved easily on site. In addition, the control can be performed based on the directly-measured temperature, so that quality of the stress-improving effect can be guaranteed.

In addition, in a case where the heating with the laser beams is performed while the inner surface of the tubular body is forcibly cooled, each of the temperature-rising time, the heating width in the circumferential direction, and other variables can be controlled within a wider range than otherwise. Accordingly, the treatment becomes easier.

BRIEF DESCRIPTION OF THE DRAWINGS

FIG. 1 FIG. 1A is a schematic diagram illustrating a tubular-body residual-stress improving apparatus according to the present invention. FIG. 1B is a diagram for describing the shape of a pipe, a heating width, a moving speed, and the like.

FIG. 3 FIGS. 3A and 3B are graphs each illustrating the relationship between the temperature and a dimensionless time. FIG. 3A is illustrated with respect to the temperature of the inner surface. FIG. 3B is illustrated with respect to the temperature of the outer surface.

FIG. 4 FIGS. 4A and 4B are graphs each illustrating the relationship between a stress and the dimensionless position in the wall-thickness direction. FIG. 4A is illustrated with respect to the stress in the circumferential direction. FIG. 4B is illustrated with respect to the stress in the axial direction.

FIG. 5 FIGS. 5A and 5B are graphs each illustrating the relationship between the stress and the position in the axial direction. FIG. 5A is illustrated with respect to the stress of the inner surface in the circumferential direction. FIG. 5B is illustrated with respect to the stress of the inner surface in the axial direction.

FIG. 6 FIGS. 6A and 6B are graphs each illustrating the relationship between the stress and the position in the axial direction. FIG. 6A is illustrated with respect to the stress of the outer surface in the circumferential direction. FIG. 6B is illustrated with respect to the stress of the outer surface in the axial direction.

FIG. 7 FIG. 7A is a chart for describing a temperature-rising time according to the present invention.

FIG. 13 FIG. 13A is a diagram for describing a pipe formed by welding members of different materials.

FIG. 14 FIGS. 14A and 14B are graphs each illustrating the stresses at various positions in the axial direction in a case where the present invention is applied to a pipe formed by welding members of different materials. FIG. 14A is illustrated with respect to the stresses in the circumferential direction. FIG. 14B is illustrated with respect to the stresses in the axial direction.

FIG. 16 FIG. 16A is a graph illustrating the relationship between the temperature-rising-time parameter and the thermal stress in the water-cooling mode.

FIG. 18 FIGS. 18A and 18B are graphs each illustrating the relationship between the stress and the position in the axial direction in the water-cooling mode. FIG. 18A is illustrated with respect to the stress in the axial direction. FIG. 18B is illustrated with respect to the stress in the circumferential direction.

EXPLANATION OF REFERENCE NUMERALS

1: residual-stress improving apparatus; 2: pipe; 3: rotationally driving apparatus; 4: arm portion; 5: optical head; 6: optical fiber; 7: laser oscillator; 8: regulation unit; 9: thermocouple; C: welded portion; D: outer diameter of pipe; h: wall-thickness of pipe; L: heating length in axial direction; r: average radius of pipe; S: heating area; v: moving speed in circumferential direction; W: heating width in circumferential direction.

BEST MODES FOR CARRYING OUT THE INVENTION

Detailed descriptions will be given, with reference to FIGS. 1 to 18, as to a tubular-body residual-stress improving method and a tubular-body residual-stress improving apparatus according to the present invention.

Embodiment 1

Configuration of Apparatus

Figure 1A:
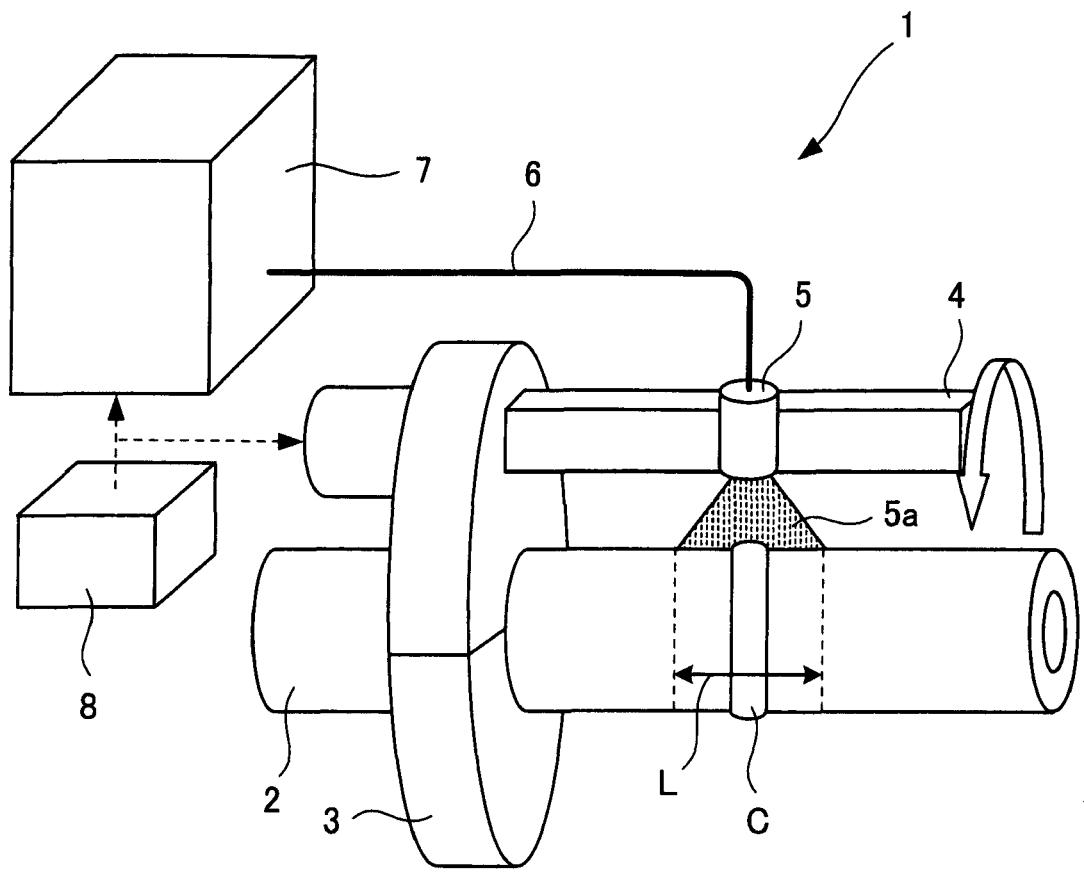
Figure 1B:
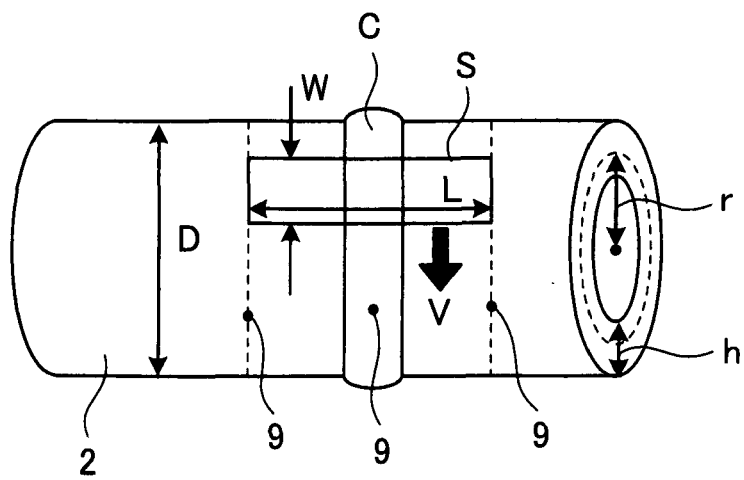

FIG. 1A is a schematic diagram illustrating a tubular-body residual-stress improving apparatus according to the present invention.

As FIG. 1A shows, a residual-stress improving apparatus 1 includes a rotationally driving apparatus 3 (rotationally driving means), an arm portion 4, an optical head 5, a laser oscillator 7, and a regulation unit 8. The rotationally driving apparatus 3 is disposed so as to be capable of moving circling around the outer circumference of a pipe 2, which is a cylindrical tubular body. The rotationally driving apparatus 3 moves at the regulatable moving speed v in the circumferential direction of the pipe 2. The arm portion 4 is held by the rotationally driving apparatus 3, extends along the axial direction of the pipe 2, and is capable of circling concentrically with and around the pipe 2. The optical head is held by the arm portion 4, and irradiates a predetermined area of the outer-circumferential surface of the pipe 2 with laser beams 5a. The laser oscillator 7 is connected to the optical head 5 by means of an optical fiber 6, and supplies laser beams to the optical head 5 through the optical fiber 6. The regulation unit 8 regulates the rotationally driving apparatus 3, the laser oscillator 7, and the like. Note that plural laser oscillators and optical heads are sometimes provided in the arm of the rotationally driving apparatus, depending on the size of the heating area.

The rotationally driving apparatus 3 is detachably attached to the outer circumference of the pipe 2. The rotationally driving apparatus 3 can be placed freely at any position where the residual stress needs to be improved such for example as at a position located around a welded portion C. Note that the rotationally driving apparatus 3 may have any configuration as long as the rotationally driving apparatus 3 holds the pipe 2 on its inner-circumference side and has a rotatable outer-circumference side where the arm portion 4 is held. For example, a possible configuration may have a fixing portion located on its inner-circumference side and a circling portion on its outer-circumference side. The fixing portion is a fixing side that holds the pipe 2. The circling portion is a circling side which holds the arm portion 4 and circles concentrically with and around the pipe 2.

The optical head 5, the optical fiber 6, and the laser oscillator 7 together form a heating optical system. The optical head 5 attached to the arm portion 4 irradiates a predetermined area of the outer-circumferential surface of the pipe 2 with the laser beams 5a so that the predetermined area can be heated uniformly. Either the optical head 5 as a whole or just some of its components such as a lens and a mirror may be mounted on, for example, a sliding mechanism that is capable of changing the position of the above-mentioned member or members mounted thereon. By changing the position, the irradiation length L in the axial direction and the irradiation width W in the circumferential direction are adjusted, and thus the irradiation area S to be heated is adjusted (see FIG. 1B). In addition, a longer irradiation length L in the axial direction may be achieved by providing plural optical heads 5 that are attached to the arm portion 4 along the axial direction of the pipe 2, and that are connected to the laser oscillator 7 through plural optical fibers 6 so as to supply laser beams to the optical heads 5.

Treatment is performed in the residual-stress improving apparatus 1 according to the present invention in the following way. The area to be heated is adjusted by adjusting the optical head 5. Then, the regulation unit 8 regulates the output of the laser oscillator 7, and also causes the rotationally driving apparatus 3 to move circling while regulating the moving speed thereof at a predetermined moving speed. Circling around the outer circumference of the pipe 2, the optical head 5 irradiates a predetermined area of the outer-circumferential surface of the pipe 2 with the laser beams 5a. Thus, the predetermined area of the outer-circumferential surface of the pipe 2 is heated. By using a temperature difference between the inner surface and the outer surface of the pipe 2 that is caused by this heating, the inner surface is brought into a tensile-yield state. As a consequence, when the pipe 2 is cooled down, the residual stress of the inner surface thereof is reduced or is improved so as to be turned to compressive stress. The optical head 5 may circle once, or alternatively plural times. When the optical head 5 circles plural times, the circling may be finished at a position that is different from the starting position. In addition, the heating temperature is preferably below the solution heat-treatment temperature. Note that Embodiment 1 and subsequent Embodiment 2 is based on an air-cooling mode, that is, based on a case where the inside of the pipe 2 is filled with gas, or alternatively with water before the treatment is performed. However, Embodiment 3, which will be described later, is based on a water-cooling mode, that is, based on a case where the inside of the pipe 2 is always filled with water.

<Treatment Conditions>

Before describing the treatment conditions, a brief description will be given as to the principle on which the tubular-body residual-stress improving method according to the present invention is based.

When the residual stress of a predetermined area in the vicinity of the welded portion C of the pipe 2 is improved according to the present invention, the outer-circumferential surface of the pipe 2 is heated with the laser beams so as to cause a predetermined temperature difference between the outer surface and the inner surface of the pipe 2. Performing this heating turns the outer surface to a state of compressive stress, and turns the inner surface to a state of tensile stress and further to a state of tensile yield. Once the heating has been finished, the temperature difference between the inner surface and the outer surface of the predetermined area disappears, and the temperature of these surfaces is lowered down approximately to the room temperature. Then, the outer surface is turned to a state of tensile stress, and the inner surface is turned to a state of compressive stress. The yield stress allows the residual stress of the inner surface to be improved from the tensile-stress state to the compressive-stress state. The conditions under which the laser heating is performed is preferably set so that the magnitude of the stress (amount of strain) to be produced at the time of heating is at least equal to or larger than the amount of strain equivalent to the yield stress. In this way, the residual stress generated in the inner surface of the pipe 2 can be improved from the tensile state to the compressive state. As a consequence, the stress corrosion cracking can be prevented from occurring in the inner surface of the tubular body.

In order to obtain a desired amount of strain by heating, with laser, the outer-circumferential surface of the pipe 2 (the vicinity of the welded portion C), it is necessary to control the irradiation length L in the axial direction, the irradiation width W in the circumferential direction, and the like within their respective proper ranges. These conditions depend on factors such as the shape of the pipe 2 (specifically, the diameter and the wall thickness of the pipe 2), the material of the pipe 2, and the installation environment of the pipe 2. Accordingly, it is necessary to change the treatment conditions depending on the configuration of each tubular body. However, nothing has conventionally been defined clearly for the irradiation length L in the axial direction, the irradiation width W in the circumferential direction, or the like. Accordingly, it is difficult to control the treatment conditions to obtain a predetermined amount of strain.

So, the inventors studied the possibility of controlling the optimal treatment conditions without being influenced by such factors as the shape of the pipe 2.

Specifically, elastoplastic analysis was performed on the following four kinds of pipe shapes (all of the pipes are made of the same material of SUS304). By comparing the residual stress after treatment, the influence of the diameter and of the wall thickness of each pipe on the effect of improving the stress was assessed. The shapes of the pipes used in the assessment differed in an external diameter of the pipe D, a wall thickness of the pipe h, and an average radius r as shown in Table 1 given below (see FIG. 1B). Note that, when the pipes have different shapes, the residual stresses inducted in the respective pipes by welding differ from one another. Accordingly, in order to clearly show the influence of the diameter and of the wall thickness of the pipe, raw pipes each of which has no initial stress were used. In addition, the 14B-pipe-A shown in Table 1 was included in the assessment for the purpose of studying the influence of the wall thickness.

TABLE 1

| | External Diameter of Pipe D (mm) | Wall Thickness of Pipe h (mm) | Average Radius r (mm) |
|---|---|---|---|
| 4B-Pipe | 114.3 | 13.5 | 50.4 |
| 2B-Pipe | 60.5 | 5.5 | 27.5 |
| 14B-Pipe | 355.6 | 35.7 | 159.95 |
| 14B-Pipe-A | 355.6 | 13.5 | 171.05 |

The treatment conditions for each shape of the pipe were set up as follows for the purpose of controlling each condition as dimensionless one. In the following treatment conditions: to (sec) represents the temperature-rising time, that is, the length of time that takes for the temperature of the outer surface of the pipe 2 that has exceeded 100° C. to reach the highest achieving temperature Tmax; k (mm²/sec) represents the thermal diffusivity of the pipe 2; and v (mm/sec) represents the moving speed of a laser light source.

(a) It was assumed that the temperature-rising time could be arranged according to the temperature-rising time parameter Fo defined by the following formula (1). The temperature-rising time parameter Fo was assumed to be 0.08.

$$Fo = \tau_0 \times k / h^2 \qquad \text{Formula (1).}$$

(b) It was assumed that the heating width W in the circumferential direction could be arranged according to $\sqrt{(rh)}$. The heating width W in the circumferential direction was assumed to be $1.7\sqrt{(rh)}$. Note that the heating width W in the circumferential direction is a width that is effective when the pipe is heated up to the highest achieving temperature. The following formula (2) shows the relationship that the heating width W in the circumferential direction has with other parameters.

$$W = \tau_0 \times v \qquad \text{Formula (2).}$$

(c) It was also assumed that the heating length L in the axial direction could be arranged according to $\sqrt{(rh)}$. The heating length L in the axial direction was assumed to be $3.0\sqrt{(rh)}$. Note that the heating length in the axial direction is a length, in the axial direction, of the area the outer surface of which is heated up to a predetermined temperature (see FIG. 7B).

(d) The moving speed v was obtained from the formula (3) that was obtained from the formulas (1) and (2).

$$v = (W \times k)/(Fo \times h^2) \qquad \text{Formula (3).}$$

In the formula (3), the heating width W in the circumferential direction was a constant of $1.7\sqrt{(rh)}$, the thermal diffusivity k was also a constant, the temperature-rising time parameter Fo was 0.08, and the wall thickness h was also a constant. Accordingly, the speed v was determined.

Then, under the above-described conditions, the two-circling treatment was carried out. In the first circling, the starting and the ending positions were at 0° and at 360°, respectively. In the second circling, both the starting and the ending positions were at 180°. The treatment conditions for each shape of the pipe are summarized in Table 2.

In the above-described treatment conditions, the temperature-rising time parameter Fo represents dimensionless time. This dimensionless time is a dimensionless amount showing temporal diffusion of the temperature in a nonstationary state by heat conduction. In this invention, it is necessary to achieve a proper temperature distribution in the wall-thickness direction. What is important to this end is temperature distribution (temporal diffusion) in the wall-thickness direction in a nonstationary state. Accordingly, from this point of view, the temperature-rising time parameter Fo was employed as the temperature-rising time.

In addition, a parameter obtained by arranging the heating width W in the circumferential direction according to $\sqrt{(rh)}$, that is, the heating-width in-the-circumferential-direction parameter $G = W/\sqrt{(rh)}$, which will be described later, represents a dimensionless distance. In the present invention, what has to be taken into consideration is the influence of thermal deformation caused by local heating with laser beams. Specifically, when local heating is performed with laser beams, bending deformation in which the outer surface protrudes (deformation such that the external diameter becomes larger) is caused by the thermal expansion of the heated portion. Accordingly, there occurs a state in which the room-temperature portion restrains the deformation. When this state is replaced with a pipe having a locally loaded internal pressure p, bending moment M and shear force Q are generated in the bordering portion. When the average radius is denoted by r; the wall thickness by h; the Young's modulus by E; the Poisson's ratio by ν; and the distance from the border by x, the amount of deflection δ of the pipe is represented by the following formula (4).

[Numerical Expression 1]

$$\delta = \frac{-1}{2\beta^2 D}\{\beta \times Mo \times \phi(\beta \times x) + Qo \times \theta(\beta \times x)\} \quad \text{(Formula 4)}$$

where $$\beta^4 = \frac{3(1-\nu^2)}{(rh)^2}$$

$$D = \frac{E \times h^3}{12(1-\nu^2)}$$

$$\phi(\beta \times x) = \exp(-\beta \times x)\{\cos(\beta \times x) - \sin(\beta \times x)\}$$

$$\theta(\beta \times x) = \exp(-\beta \times x)\cos(\beta \times x)$$

$$Mo = \frac{p}{2\beta^2}$$

$$Qo = -\frac{p}{\beta},$$

The formula (4) demonstrates that the amount of deflection is a function of [β×x]. In addition, as shown in the formula (5) given below, [β×x] can be expressed with √(rh), so that the deformation caused by thermal expansion can be expressed, in a similar manner, with √(rh). Accordingly, from this point of view, in order to obtain a dimensionless width in the circumferential direction, heating-width in-the-circumferential-direction parameter G, which is obtained by arranging the heating width W in the circumferential direction according to √(rh), was used.

$$\beta \times x \approx 1.3 \times \sqrt{(rh)} \quad \text{Formula (5)}.$$

Note that the formula (5) is obtained with ν=0.3.

Figure 2:
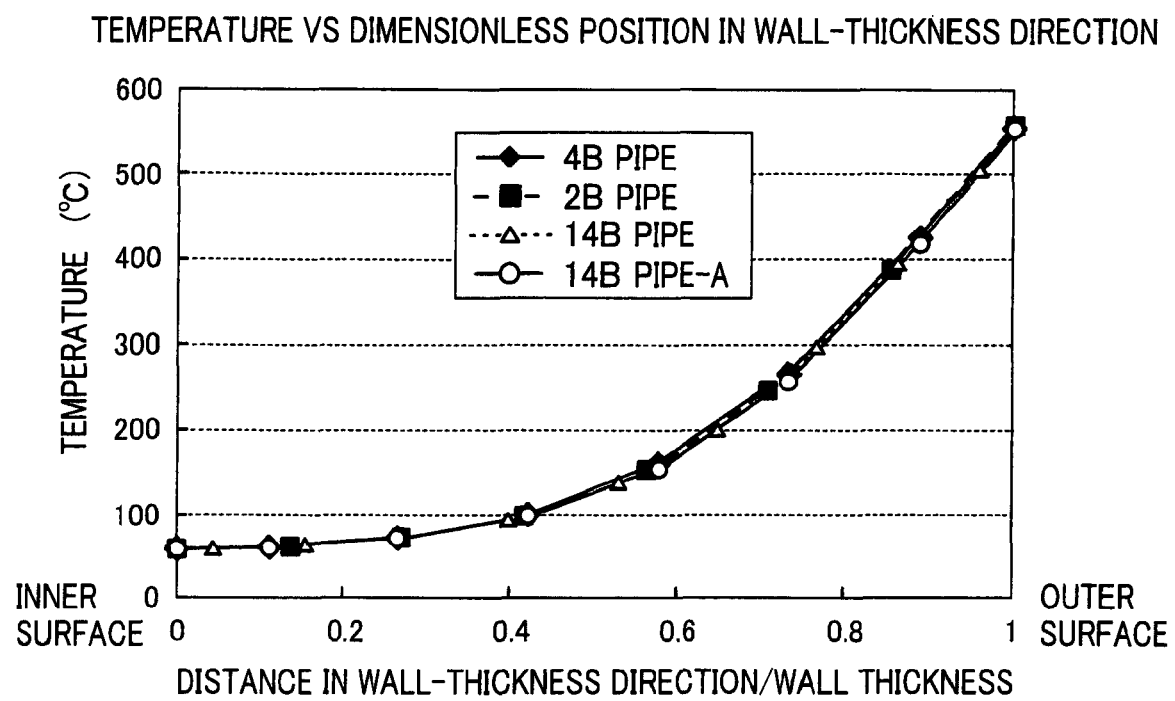
FIG. 2 is a graph illustrating the relationship between a temperature and a dimensionless position in the wall-thickness direction.

FIG. 2 shows, as the results of thermal conduction analysis performed under the above-described treatment conditions, a comparison of temperature distributions in the wall-thickness direction for the pipe shapes at the time when the outer-surface temperature is highest at the position of 180° in the first circling of the treatment. Note that the horizontal axis represents the "dimensionless distance" obtained by dividing the wall thickness by the distance from the inner surface, and that the vertical axis represents the temperature at the position of 180°. FIG. 2 clearly demonstrates that the temperature distributions in the wall-thickness direction for all of the four kinds of pipes are quite similar to one another.

Figure 3A:
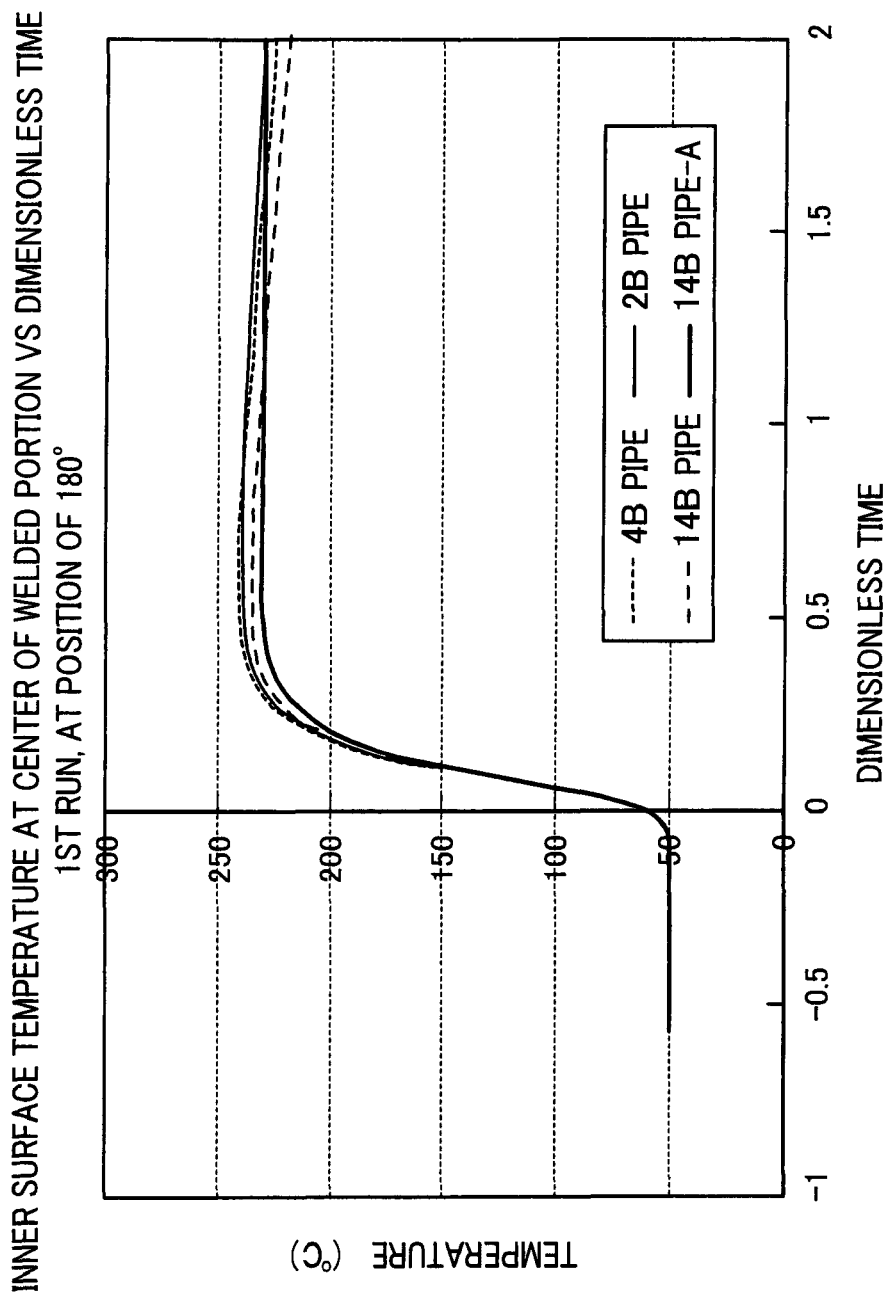

FIGS. 3A and 3B show, as the results of thermal conduction analysis performed under the above-described treatment conditions, time histories of the inner-surface temperature and of the outer-surface temperature at the position of 180° in the first circling of the treatment. The horizontal axis represents a "dimensionless time" obtained by multiplying the time by a constant and then dividing the product by the square of the wall thickness; and the vertical axis represents the temperature history at the position of 180°. Incidentally, the origin of the dimensionless time is set at the highest achievable temperature. FIGS. 3A and 3B clearly demonstrate that the temperature histories for all of the four kinds of pipes are nearly identical to one another.

FIGS. 4A and 4B show the distributions of stress in the circumferential direction and of stress in the axial direction at the position of 90° while the distributions are arranged according to a dimensionless distance obtained by dividing the distance in the wall-thickness direction by the wall thickness. FIGS. 4A and 4B demonstrate that the stress distributions in the wall-thickness direction for all of the four kinds of pipes are nearly identical to one another. Similar tendencies are observed in the distributions of the stress in the circumferential direction and of the stress in the axial direction at other positions, for example, of 0°, 180°, and 270°.

FIGS. 5A and 5B as well as FIGS. 6A and 6B show the distributions of the stress in the circumferential direction and of the stress in the axial direction for the inner and the outer surfaces, while the distributions are arranged according to a dimensionless distance obtained by dividing the distance in the axial direction from the center (symmetry plane) by √(rh). FIGS. 5A and 5B as well as FIGS. 6A and 6B demonstrate that the distributions, both in the in the circumferential direction and in the axial direction, of the stress for the inner and the outer surfaces for all of the four kinds of pipes are nearly identical to one another.

As has been demonstrated above, the distributions of the outer-surface temperature arranged according to the "dimensionless time" and the "dimensionless distance" for all of the four kinds of pipe shapes are nearly identical to one another. In addition, the stress distributions arranged according to the "dimensionless distance" for all of the four kinds of pipe shapes are also nearly identical to one another. Accordingly, when the treatment conditions are set up using the "dimensionless time" and the "dimensionless distance," the similarity rule applies even to the pipes with different shapes. Optimal treatment conditions can be controlled more easily by controlling the temperature-rising time, the heating width in the circumferential direction, and the heating length in the axial direction by means of the dimensionless time and the dimensionless distances as described above. As a consequence, the equal-level effect of improving residual stress can be obtained, irrespective of the shapes of the pipes.

The above-mentioned treatment conditions are obtainable using the temperature history of the thermometer installed on the outer surface of the pipe. To put it differently, controlling the temperature history of the thermometer installed on the outer surface of the pipe enables the control of the above-mentioned treatment conditions.

TABLE 2

|  | Temperature-rising parameter Fo | Speed v (mm/s) | Heating Width in Circumferential Direction W (mm) | Heating Length in Axial Direction L (mm) | Highest Achieving Temperature Tmax (° C.) |
|---|---|---|---|---|---|
| 4B-Pipe | 0.08 | 12.4 | 1.7√(rh) | 3√(rh) | 550 |
| 2B-Pipe |  | 35.8 |  |  |  |
| 14B-Pipe |  | 5 |  |  |  |
| 14B-Pipe-A |  | 22.4 |  |  |  |

Specifically, when the outer-circumferential surface of the pipe is locally irradiated at the welded portion with the laser beams and the irradiated area is rotated in the circumferential direction, only the temperature-rising time $\tau o$, the highest achieving temperature Tmax, and the heating length L in the axial direction have to be measured, as the temperature history, by means of the thermometer installed on the outer surface of the pipe. So, what will be described next is the procedure to measure the temperature-rising time $\tau o$, the highest achieving temperature Tmax, and the heating length L in the axial direction.

On the outer surface of the pipe to be treated, plural thermocouples 9 are installed in an area that the irradiation area S passes through. Alternatively, the plural thermocouples 9 may be installed in an area that the irradiation area S passes through on the outer surface of another pipe having the same conditions as the pipe to be treated (i.e., the same diameter and the same wall thickness, and the same material). At least three thermocouples 9, in total, have to be installed: one at a position where the center of the irradiation area passes through; one at each end portion of the irradiation area while these two positions and the above-mentioned position need to be on the same line extending in the axial direction. It is preferable that plural sets of thermocouples each of which includes the above-mentioned three or more thermocouples be disposed in the circumferential direction of the pipe 2 (see FIG. 1B). Then, while the vicinity of the welded portion C of the outer-circumferential surface of the pipe 2 is irradiated with the laser beams and the irradiation area S is rotated, the change in the temperature for each of the thermocouples 9 installed on the outer surface of the pipe 2 is measured. The measurement history thus obtained is used to figure out the temperature-rising time $\tau o$ and the highest achieving temperature Tmax.

Figure 7A:
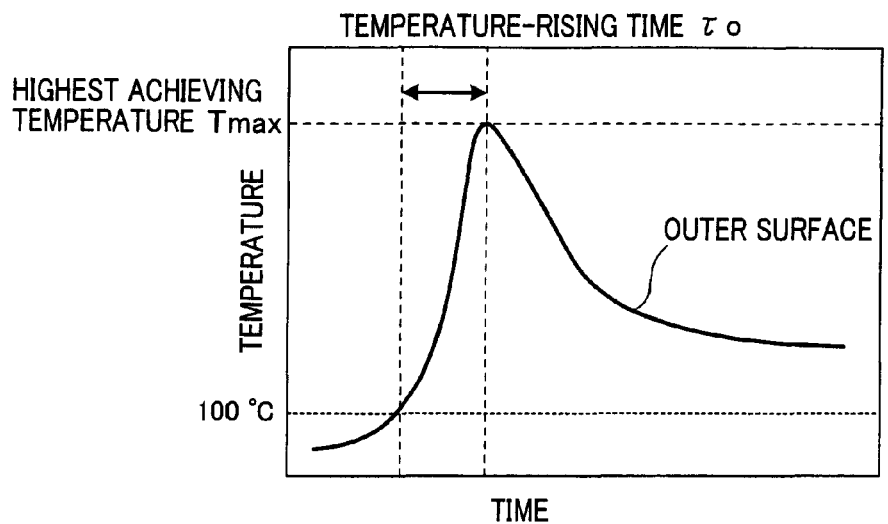
Figure 7B:
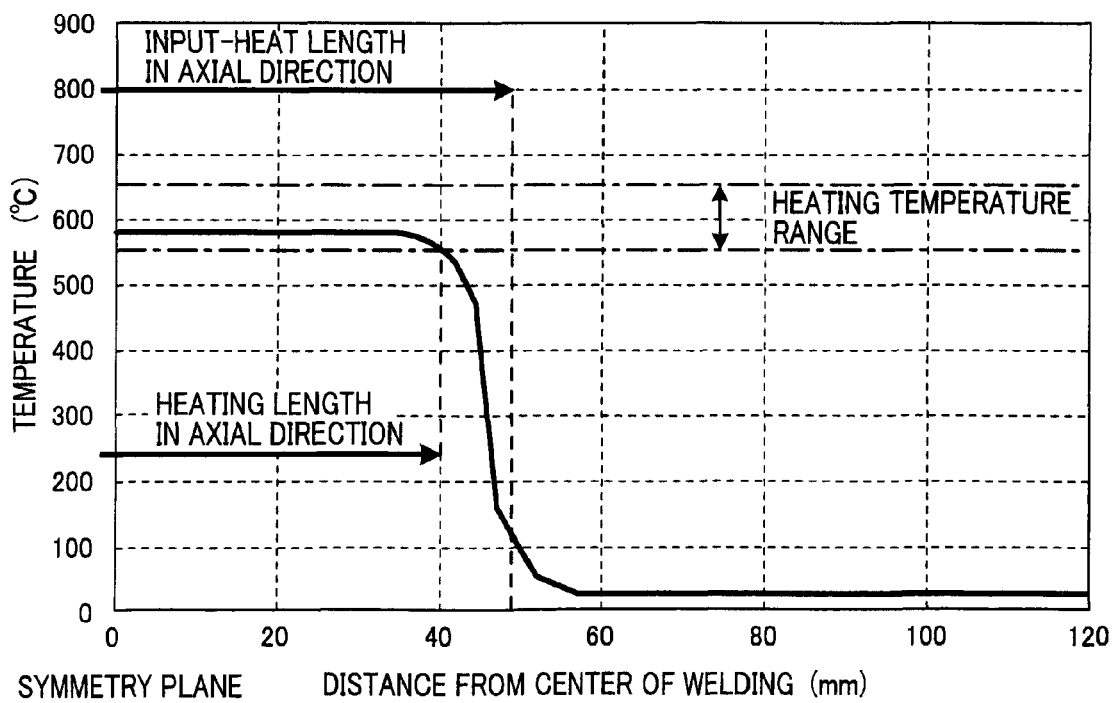
FIG. 7B is a chart for describing a heating length in the axial direction according to the present invention.

To be more specific, as FIG. 7A shows, the highest temperature reached by the temperature of the thermocouples 9 installed on the outer surface of the pipe 2 is measured as the highest achieving temperature Tmax, and the length of time from the time when the temperature of the thermocouples 9 exceed 100° until the temperature reaches the highest achieving temperature Tmax is measured as the temperature-rising time $\tau o$. In addition, as FIG. 7B shows, the area in which the highest achieving temperature Tmax of the plural thermocouples 9 installed along the axial direction on the outer surface of the pipe 2 is within a predetermined temperature range is defined as the heating length L in the axial direction. Moreover, the heating width W in the circumferential direction is obtained as a product of the temperature-rising time $\tau o$ and the moving speed v of the optical head 5 ($\tau o \times v$). Note that a proper temperature range of the highest achieving temperature Tmax is determined in accordance with the material that the pipe 2 is made of, as will be described later. The temperature range thus determined is used as the temperature range to determine the heating length L in the axial direction. For example, in the case of SUS304, it is preferable that 550° C.≤Tmax<650° C.

The use of the temperature-rising time $\tau o$, of the highest achieving temperature Tmax, of the heating length L in the axial direction, and of the heating width W in the circumferential direction thus obtained allows the control of the treatment conditions to be done independently of the diameter or of the wall thickness of the pipe 2.

As has been described thus far, the temperature-rising time $\tau_0$, the highest achieving temperature Tmax, and the heating length L in the axial direction are measured on the basis of the temperature history of the thermometer installed on the outer surface of the pipe. Accordingly, the treatment quality can be guaranteed. It is not necessary to measure the input-heat density distribution of the used laser beams, so that the treatment control can be easily be done on site. In addition, the temperature can be directly measured, so that the quality of the stress improvement can be guaranteed.

In addition, a desired stress improvement can be accomplished without failure by, for example, checking the temperature history before the treatment is performed. For this reason, a very effective treatment control can be done. Specifically, when the heating temperature is lowered, the retrying of the treatment is possible, but when the heating temperature becomes too high, the heating area is exposed to the sensitizing temperature, which gives a harmful influence to the material itself. In contrast, according to the stress improving method of the present invention, the treatment conditions are controlled by checking the temperature history so that both of the above-mentioned cases of failure can be prevented. As a consequence, a desired stress improvement operation can be performed without failure.

<Control Range>

The inventors determined a preferable control range for each of the treatment conditions in order to improve the residual stress. Here, the 4B-pipe has an external diameter of 114.3 mm and a wall thickness of 13.5 mm; the 2B-pipe has an external diameter of 60.5 mm and a wall thickness of 8.7 mm; the 14B-pipe has an external diameter of 355.6 mm and a wall thickness of 35.7 mm.

(1) Temperature-Rising Time Parameter Fo

Figure 8:
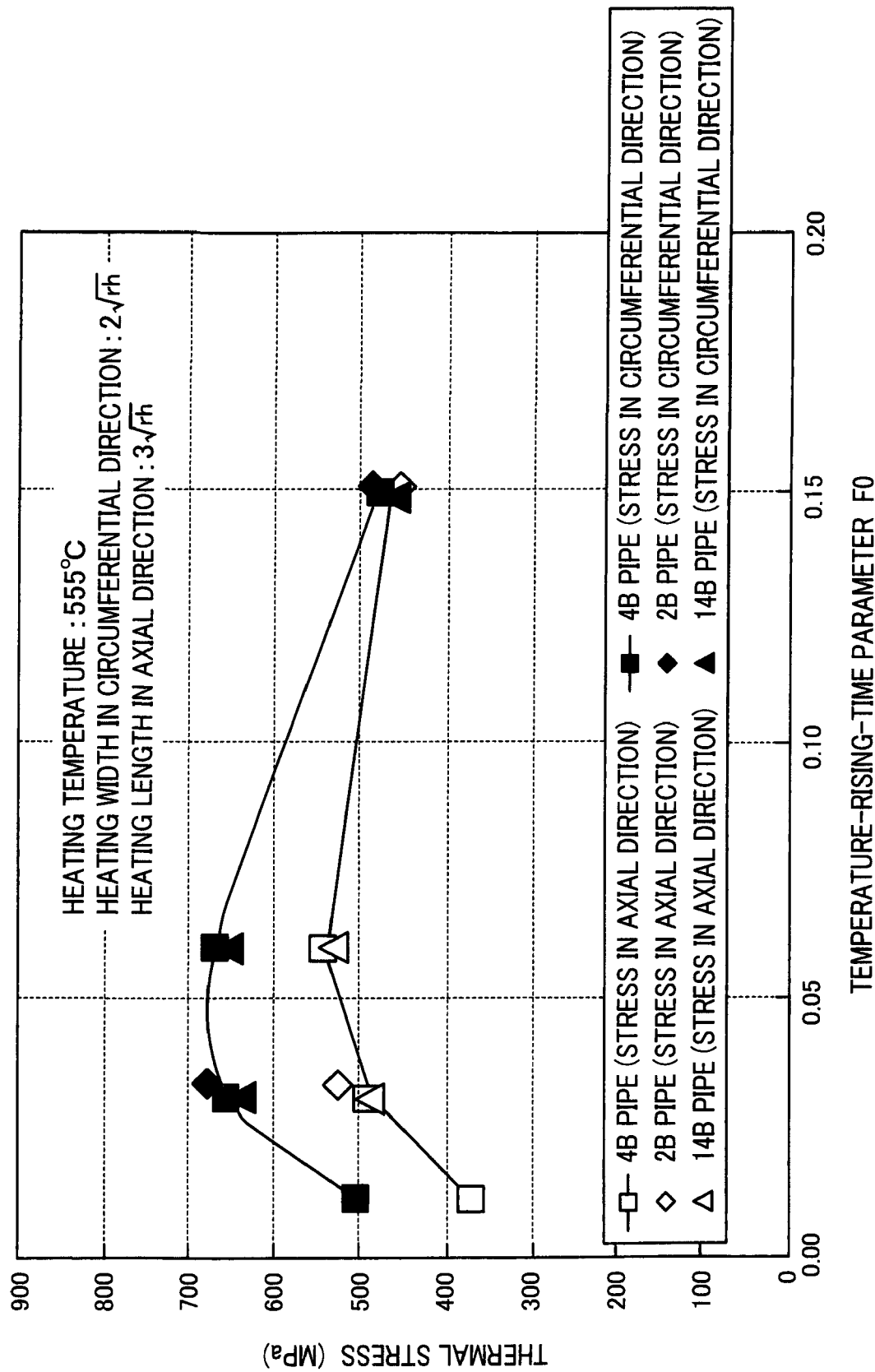
FIG. 8 is a graph illustrating the relationship between a temperature-rising-time parameter and a thermal stress according to the present invention.

To obtain an optimal range of a dimensionless number used for controlling the temperature-rising time $\tau o$ (temperature-rising time parameter Fo), an assessment was performed, by a thermoelastic analysis, on the relationship between the temperature-rising time parameter Fo and the thermal stress produced in the inner surface by the laser irradiation (see FIG. 8). To this end, the pipes of the different shapes described in Table 1 were subjected to the thermoelastic analysis. The temperature-rising time from the time when the outer-surface temperature exceeded 100° C. until the temperature reached the highest achieving temperature Tmax was denoted by $\tau o$ (sec).

Here, the apparatus illustrated in FIG. 1 was used. The relationship between the temperature-rising time parameter Fo and the thermal stress produced in the inner surface was obtained on condition that the parameters other than the temperature-rising time parameter Fo were set at constant values (specifically, the highest achieving temperature Tmax=555° C., the heating length in the axial direction L=3×√(rh), and the heating width in the circumferential direction W=2×√(rh)).

The results shown in FIG. 8 demonstrate that the thermal stress produced in the inner surface is the same for each of the pipes of different shapes as long as the temperature-rising time parameter Fo is the same (note that the highest achieving temperature Tmax, the heating length L in the axial direction, and the heating width W in the circumferential direction are also the same). This means that the same phenomenon can be obtained in the residual stress improving effect.

Accordingly, by controlling the temperature-rising time $\tau o$ by means of a dimensionless number, that is, by means of the temperature-rising time parameter Fo, the temperature-rising time $\tau o$ can be controlled by means of the same range of Fo even when the target pipes have different wall thicknesses and material properties. Note that the temperature-rising time parameter Fo is preferably set, for example, between 0.04 and 0.08, inclusive, because a value within such a range makes the thermal stress in the axial direction twice as large as or larger than the yielding stress of stainless steel (i.e., not less than 500 MPa).

With a too small value of Fo (i.e., when the temperature-rising time is too short), only the outer surface is heated so that a large compressive stress is produced in the outer surface and a small tensile stress is produced in the inner surface. Conversely, with a too large value of Fo (i.e., when the temperature-rising time is too long), the temperature difference formed in the wall-thickness direction is not large enough to produce sufficiently large tensile stress in the inner surface. For these reasons, the value of Fo has to be within a proper range (i.e., has to have an upper limit and a lower limit).

(2) Heating Width W in the Circumferential Direction

Figure 9:
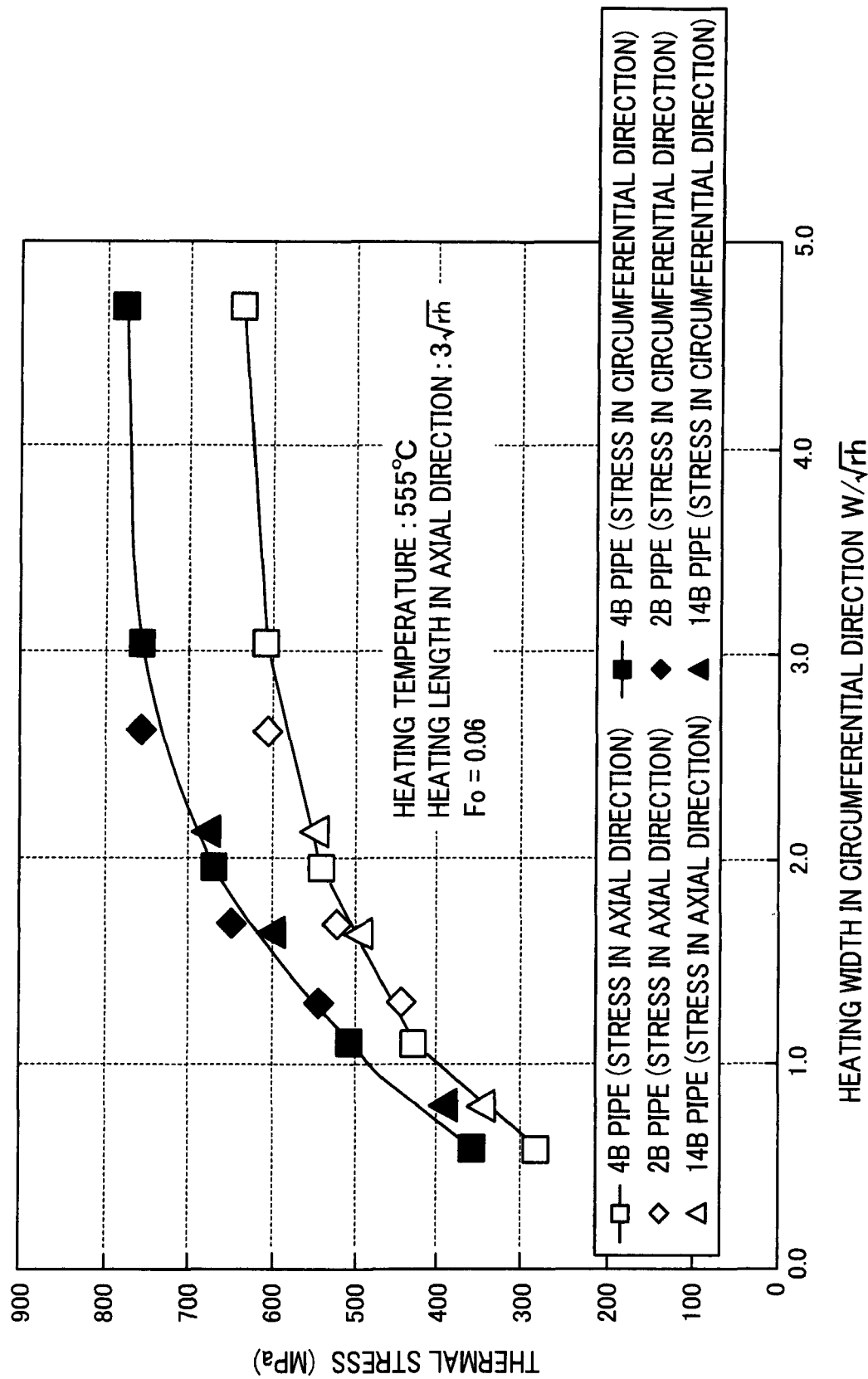
FIG. 9 is a graph illustrating the relationship between the heating width in the circumferential direction and the thermal stress according to the present invention.

To obtain an optimal range of a dimensionless number used for controlling the heating width W in the circumferential direction (in-the-circumferential-direction heating-width parameter $G=W/\sqrt{(rh)}$), a study was done on the relationship between the in-the-circumferential-direction heating-width parameter $G=W/\sqrt{(rh)}$ and the results obtained by a thermoelastic analysis on the thermal stress produced in the inner surface by the laser irradiation (see FIG. 9). To this end, the pipes of the different shapes described in Table 1 were subjected to the study.

The apparatus illustrated in FIG. 1 was also used here. The relationship between the in-the-circumferential-direction heating-width parameter G and the thermal stress was obtained on condition that the parameters other than in-the-circumferential-direction heating-width parameter G were set at constant values (specifically, the temperature-rising time parameter Fo=0.06, the highest achieving temperature Tmax=555° C., and the heating length in the axial direction $L=3\times\sqrt{(rh)}$).

The results shown in FIG. 9 demonstrate that the thermal stress produced in the inner surface is the same for each of the pipes of different shapes as long as the in-the-circumferential-direction heating-width parameter G is the same (note that the temperature-rising time parameter Fo, the highest achieving temperature Tmax, and the heating length L in the axial direction are also the same). This means that the same phenomenon can be obtained in the residual stress improving effect.

Accordingly, by controlling the heating width W in the circumferential direction by means of a dimensionless number converted with $\sqrt{(rh)}$, that is, by means of the in-the-circumferential-direction heating-width parameter G, the heating width W in the circumferential direction can be controlled by means of the same range of the parameter even when the target pipes have different shapes. Note that, as FIG. 9 shows, the thermal stress increases as the in-the-circumferential-direction heating-width parameter G becomes larger. Accordingly, only the lower limit of the in-the-circumferential-direction heating-width parameter G has to be controlled. The in-the-circumferential-direction heating-width parameter G is preferably set, for example, at 1.7 or larger since a value within such a range makes the thermal stress in the axial direction not less than 500 MPa.

(3) Heating Length L in the Axial Direction

Figure 10:
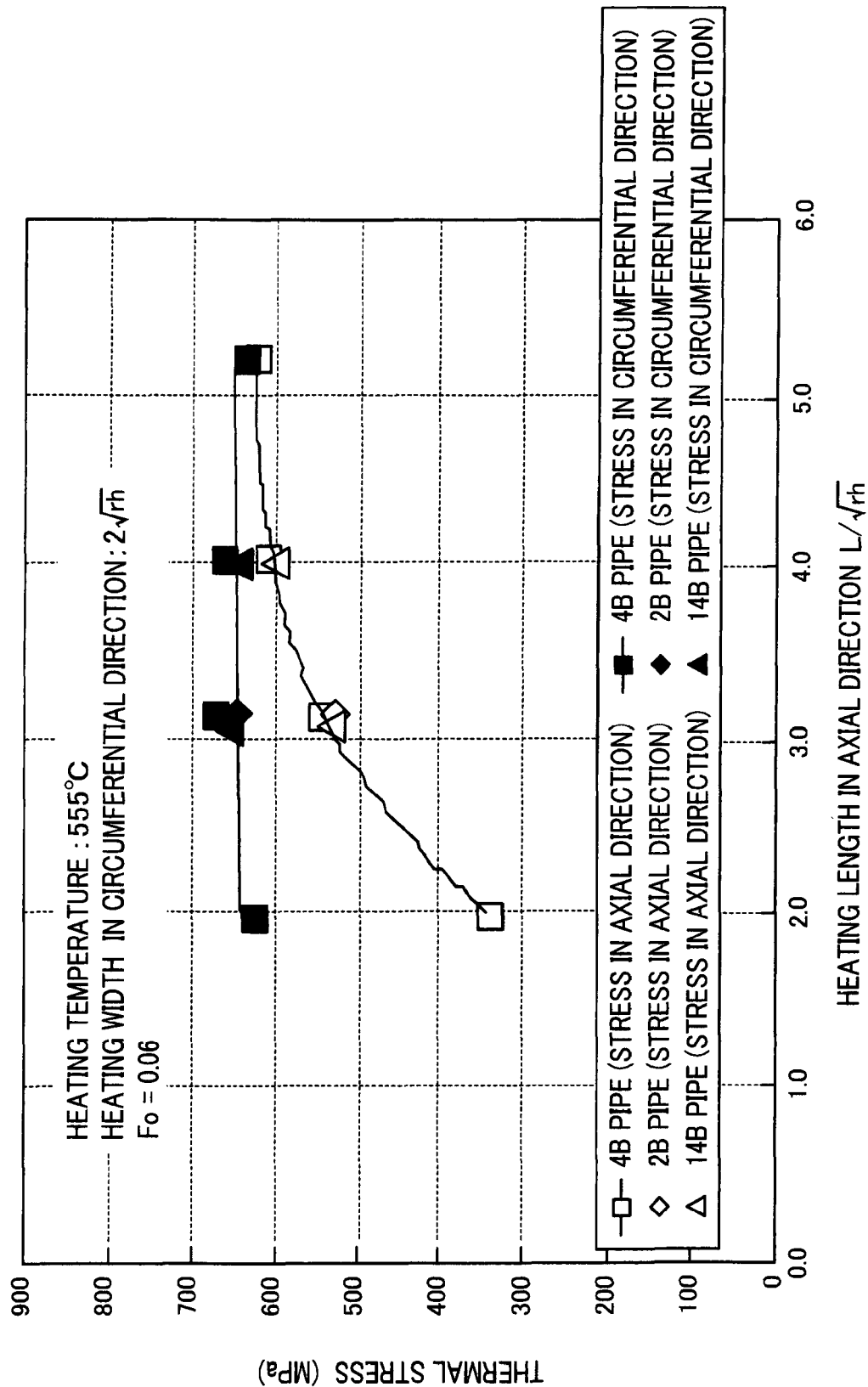
FIG. 10 is a graph illustrating the relationship between the heating length in the axial direction and the thermal stress according to the present invention.

To obtain an optimal range of a dimensionless number used for controlling the heating length L in the axial direction (in-the-axial-direction heating-length parameter $J=L/\sqrt{(rh)}$), a study was done on the relationship between the in-the-axial-direction heating-length parameter $J=L/\sqrt{(rh)}$ and the results obtained by a thermoelastic analysis on the thermal stress produced in the inner surface by the laser irradiation (see FIG. 10). To this end, the pipes of the different shapes described in Table 1 were subjected to the study.

The apparatus illustrated in FIG. 1 was also used here. The relationship between the in-the-axial-direction heating-length parameter J and the thermal stress was obtained on condition that the parameters other than in-the-axial-direction heating-length parameter J were set at constant values (specifically, the temperature-rising time parameter Fo=0.06, the highest achieving temperature Tmax=555° C., and the heating width in the circumferential direction $W=2\times\sqrt{(rh)}$).

The results shown in FIG. 10 demonstrate that the thermal stress produced in the inner surface is the same for the pipes of different shapes as long as the in-the-axial-direction heating-length parameter J is the same (note that the temperature-rising time parameter Fo, the highest achieving temperature Tmax, and the heating width W in the circumferential direction are also the same). This means that the same phenomenon can be obtained in the residual stress improving effect as long as the control conditions defined in the present invention are common.

Accordingly, by controlling the heating length L in the axial direction by means of a dimensionless number converted with $\sqrt{(rh)}$, that is, by means of the in-the-axial-direction heating-length parameter J, the heating length L in the axial direction can be controlled by means of the same range of the parameter even when the target pipes have different shapes. Note that, as FIG. 10 shows, the thermal stress increases as the in-the-axial-direction heating-length parameter J becomes larger. Accordingly, only the lower limit of the in-the-axial-direction heating-length parameter J has to be controlled. The in-the-axial-direction heating-length parameter J is preferably set, for example, at 3.0 or larger since a value within such a range makes the thermal stress in the axial direction not less than 500 MPa.

(4) Highest Achieving Temperature Tmax

Figure 11:
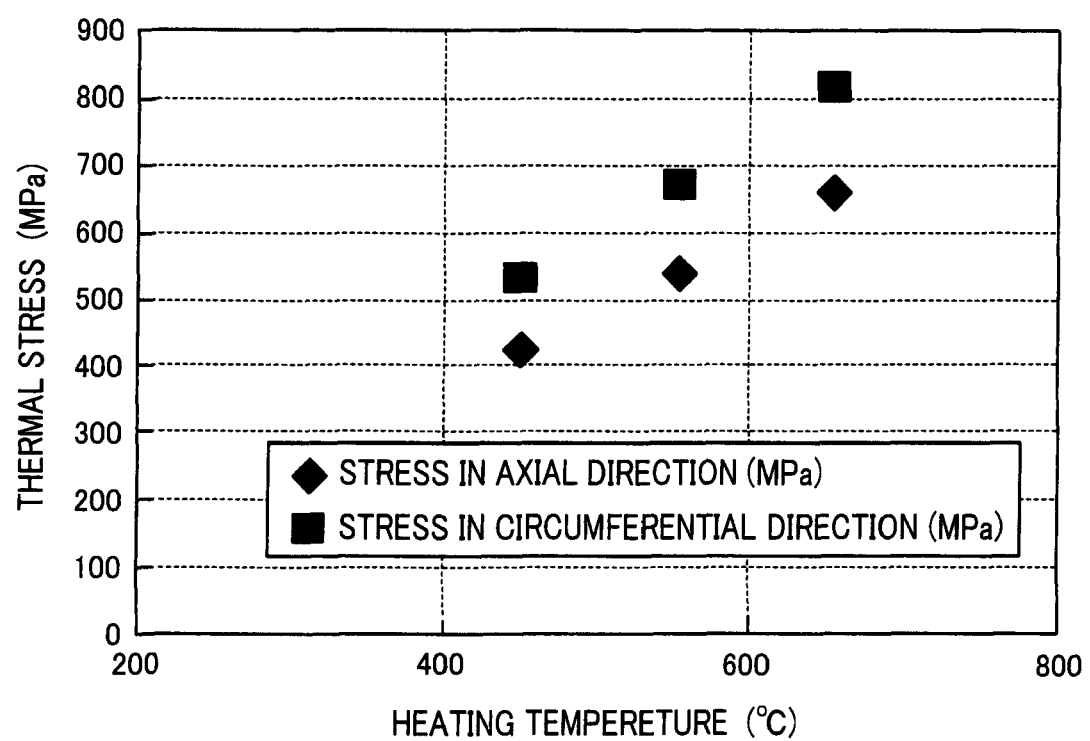
FIG. 11 is a graph illustrating the relationship between a heating temperature and the thermal stress according to the present invention.

To determine the range within which the highest achieving temperature Tmax should be controlled, a study was done on the results obtained by a thermoelastic analysis on the thermal stress produced in the inner surface by the laser irradiation in view of its relationship with the highest achieving temperature Tmax (see FIG. 11). To this end, one of the pipes of the different shapes described in Table 1 (specifically, the 4B-pipe) was subjected to the study.

The apparatus illustrated in FIG. 1 was also used here. The relationship between the highest achieving temperature Tmax and the thermal stress was obtained on condition that the parameters other than the highest achieving temperature Tmax were set at constant values (specifically, the temperature-rising time parameter Fo=0.06, the heating width in the circumferential direction $W=2\times\sqrt{(rh)}$, and the in-the-axial-direction heating-length parameter $L=3\times\sqrt{(rh)}$).

The results shown in FIG. 11 demonstrate that a larger value for the highest achieving temperature Tmax makes the thermal stress produced in the inner surface higher as long as the temperature-rising time parameter Fo, the highest achieving temperature Tmax, the heating width W in the circumferential direction, and the heating length L in the axial direction are the same for all the cases. This means that the same phenomenon can be obtained in the residual stress improving effect as long as the control conditions defined in the present invention are common.

Accordingly, by controlling the highest achieving temperature Tmax, the highest achieving temperature Tmax can be controlled by means of the same range of the parameter even when the target pipes have different shapes. Note that, as FIG. 11 shows, the thermal stress increases as the highest achieving temperature Tmax becomes larger. Accordingly, only the lower limit of the highest achieving temperature Tmax has to be controlled. With a too high value for the highest achieving temperature Tmax, however, a harmful influence may possibly be given to the material properties of the pipe, as described above. Accordingly, the highest achieving temperature Tmax should have an upper limit. For example, in the case of an austenitic stainless steel, it is preferable that 550° C.≤Tmax<650° C. This is because a value within such a range makes the thermal stress in the axial direction not less than 500 MPa.

Similar studies on other materials, such as a nickel-chromium iron alloy, a low-alloy steel, and a carbon steel, demonstrate that the preferable range for the nickel-chromium iron alloy is 550° C.≤Tmax<650° C. while the preferable range for the low-alloy steel and that for the carbon steel are 500° C.≤Tmax<595° C.

Determining the upper limit for the highest achieving temperature Tmax contributes to the prevention of the harmful influence on the material (for example, sensitization in the case of a stainless steel; and hardening and decrease in the toughness caused by quenching in the case of a low-alloy steel). In addition, determining the lower limit for the highest achieving temperature Tmax guarantees the temperature difference between the inner and the outer surfaces.

As has been described above, by determining the upper and the lower limits of the highest achieving temperature Tmax for each material property, harmful influence on the material can be prevented, and the temperature difference between the inner and the outer surfaces can be guaranteed. As a consequence, the effect of improving the residual stress can be obtained without failure.

The residual-stress improvement was observed also in the case of a dissimilar joint that has a different maximum achieving temperature, which will be described later in detail in Embodiment 2.

(5) Moving Speed v

Figure 12:
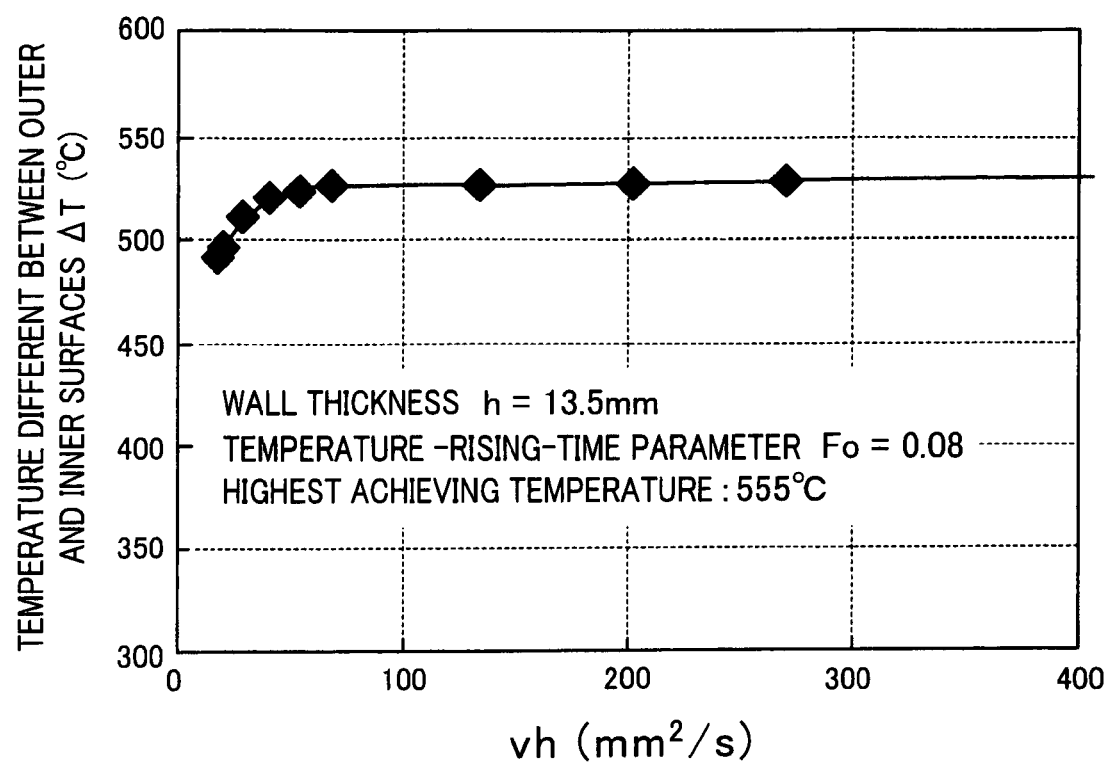
FIG. 12 is a graph illustrating the relationship between the moving speed and a temperature difference between the outer surface and the inner surface according to the present invention.

To determine the range within which the moving speed v should be controlled, a study was done on a temperature difference ΔT produced between the inner and the outer surfaces by the laser irradiation in view of its relationship with the product of the moving speed v and the wall thickness h (v×h) (see FIG. 12). To this end, one of the pipes of the different shapes described in Table 1 (specifically, the 4B-pipe) was subjected to the study.

The apparatus illustrated in FIG. 1 was also used here. The relationship between the product v×h and the temperature difference ΔT was obtained on condition that the parameters other than the product v×h were set at constant values (specifically, the temperature-rising time parameter Fo=0.08, the heating width in the circumferential direction W=2×√(rh), the in-the-axial-direction heating-length parameter L=3×√(rh), and the highest achieving temperature Tmax=555° C.).

The results shown in FIG. 12 demonstrate that, as long as the temperature-rising time parameter Fo, the highest achieving temperature Tmax, the heating width W in the circumferential direction, and the heating length L in the axial direction are the same for all the cases, a larger value for the product v×h, that is, a larger value for the moving speed v, makes a desired value for the temperature difference ΔT obtainable. Conversely, a too small value for the product v×h, that is, a too small value for the moving speed v reduces the temperature difference ΔT between the inner and the outer surfaces.

Accordingly, by controlling the product v×h, the moving speed v can be controlled by means of the same range of the parameter even when the target pipes have different shapes. In addition, a preferable value for the product v×h is not less than 70 mm²/s. This is because a value within such a range makes the temperature difference ΔT between the inner and the outer surfaces saturated.

Although the value for Fo is constant, an extremely small value for the speed v makes the temperature difference in the wall-thickness direction smaller because the heat is transferred from the heat source to the advancing side, in the traveling direction, of the heat. Accordingly, the product vh should have a lower limit.

As has been described above, determining the lower limit for the moving speed v guarantees the temperature difference ΔT between the inner and the outer surfaces. As a consequence, the effect of improving the residual stress can be obtained without failure.

Embodiment 2

Subsequently, the effect of improving the residual stress of the welding with dissimilar materials was examined under the above-mentioned treatment conditions.

Specifically, the residual-stress distribution under the above-mentioned treatment conditions was examined for a dissimilar joint of a stainless steel (SUS316) and a low-alloy steel (with a nickel-chromium iron alloy used as the weld metal).

Figure 13A:
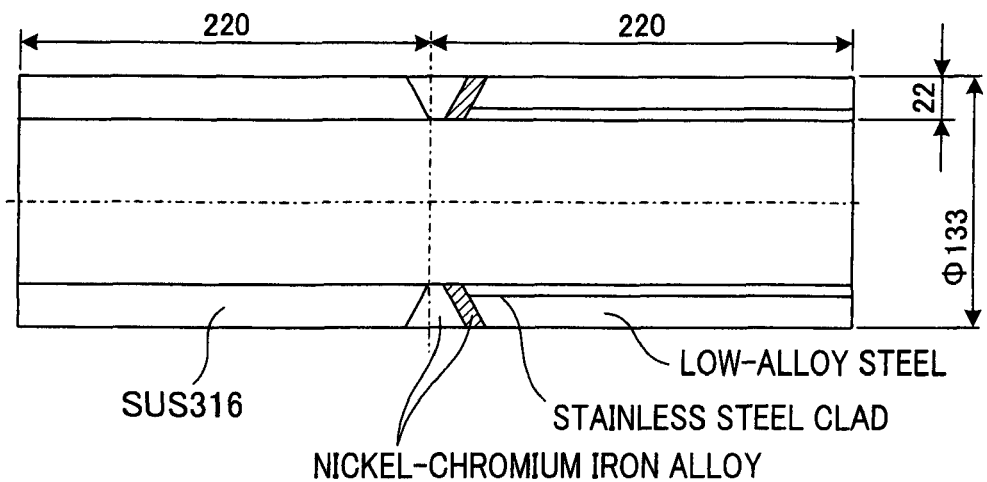
Figure 13B:
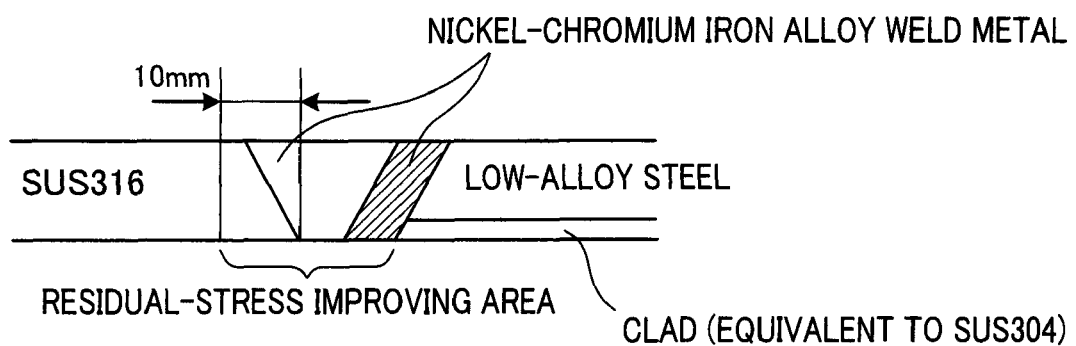
FIG. 13B is a diagram for describing a residual-stress improving area.

A pipe with an external diameter of 133 mm and a wall thickness of 22 mm was used as the target (see FIG. 13A). FIG. 13B shows an area in the pipe where the residual-stress improvement is required. This is a heat-affected zone (HAZ) of the nickel-chromium iron alloy weld metal and of the stainless steel. Note that, in order to clearly show the influence of the dissimilar materials, a raw pipe which has no initial stress were used in the examination.

In Embodiment 2, treatment conditions shown in Table 3 were set up for the nickel-chromium iron alloy weld metal, which is the target for the residual-stress improvement. In the present invention, since the laser heat source moves at a constant speed, the same temperature distribution (the same temperature-rising time parameter Fo) cannot be obtained at every position in the dissimilar joint including materials with different physical properties. For this reason, the treatment conditions were determined so that the ranges of the treatment conditions determined above could be satisfied for the nickel-chromium iron alloy, which is the target for the residual-stress improvement. Note that, among the treatment conditions shown in Table 3, the temperature-rising time parameter Fo and the heating width W in the circumferential direction were assessed at a position located at the center of the weld metal.

Although the stainless steel had a small difference in the physical properties with respect to the nickel-chromium iron alloy, the same heat-source shape as in the case of the nickel-chromium iron alloy was given to the stainless steel.

In addition, the highest temperature was determined for the low-alloy steel. The heat-source shape for the low-alloy steel was set up so that the amount of the input heat could be nearly the same as that for the nickel-chromium iron alloy. Since the low-alloy steel has a large thermal diffusivity k (≈11 mm2/s), the heat source has to have a narrow irradiation width W in the circumferential direction. Accordingly, the heating width W in the circumferential direction for the low-alloy steel was set approximately 0.65 times the corresponding width W for the nickel-chromium iron alloy, and the temperature-rising time parameter Fo for the low-alloy steel was set approximately 1.8 times the corresponding parameter Fo for the nickel-chromium iron alloy. Note that the side of the low-alloy steel is not included in the stress-improving area. Accordingly, heating of the low-alloy steel may be performed only for the purpose of preventing the locally heating from causing deformation. Neither the temperature-rising time parameter Fo nor the heating width W in the circumferential direction has to be set within the determined range.

TABLE 3

| | |
|---|---|
| External Diameter (mm) | 133 mm |
| Wall Thickness (mm) | 22 mm |
| Highest Heating Temperature | Nickel-Chromium Iron Alloy: 600° C.<br>SUS316: 600° C.<br>Low-Alloy Steel 550° C. |
| Temperature-Rising Time Parameter Fo (Temperature-Rising Time τo) | Nickel-Chromium Iron Alloy: 0.052 (7.47 s)<br>SUS316: 0.058<br>Low-Alloy Steel: 0.11 |
| Moving Speed vh (Moving Speed v) | 206 mm²/s (9.4 mm/s) |
| Heating Length L in Axial Direction | 3.1√(rh) (109 mm) |
| Heating Width W in Circumferential Direction | Nickel-Chromium Iron Alloy: 2.0√(rh) (70 mm) |

The following fact was observed under the above-described treatment conditions. At the time when the outer surface reached the highest temperature, the temperature of the inner surface was low, so that a temperature difference was formed in the wall-thickness direction. In addition, compressive stress was produced in the outer surface, and tensile stress was produced in the inner surface. Accordingly, the stress distribution for this pipe was the same as the stress distribution for a stainless-steel pipe.

Figure 14B:
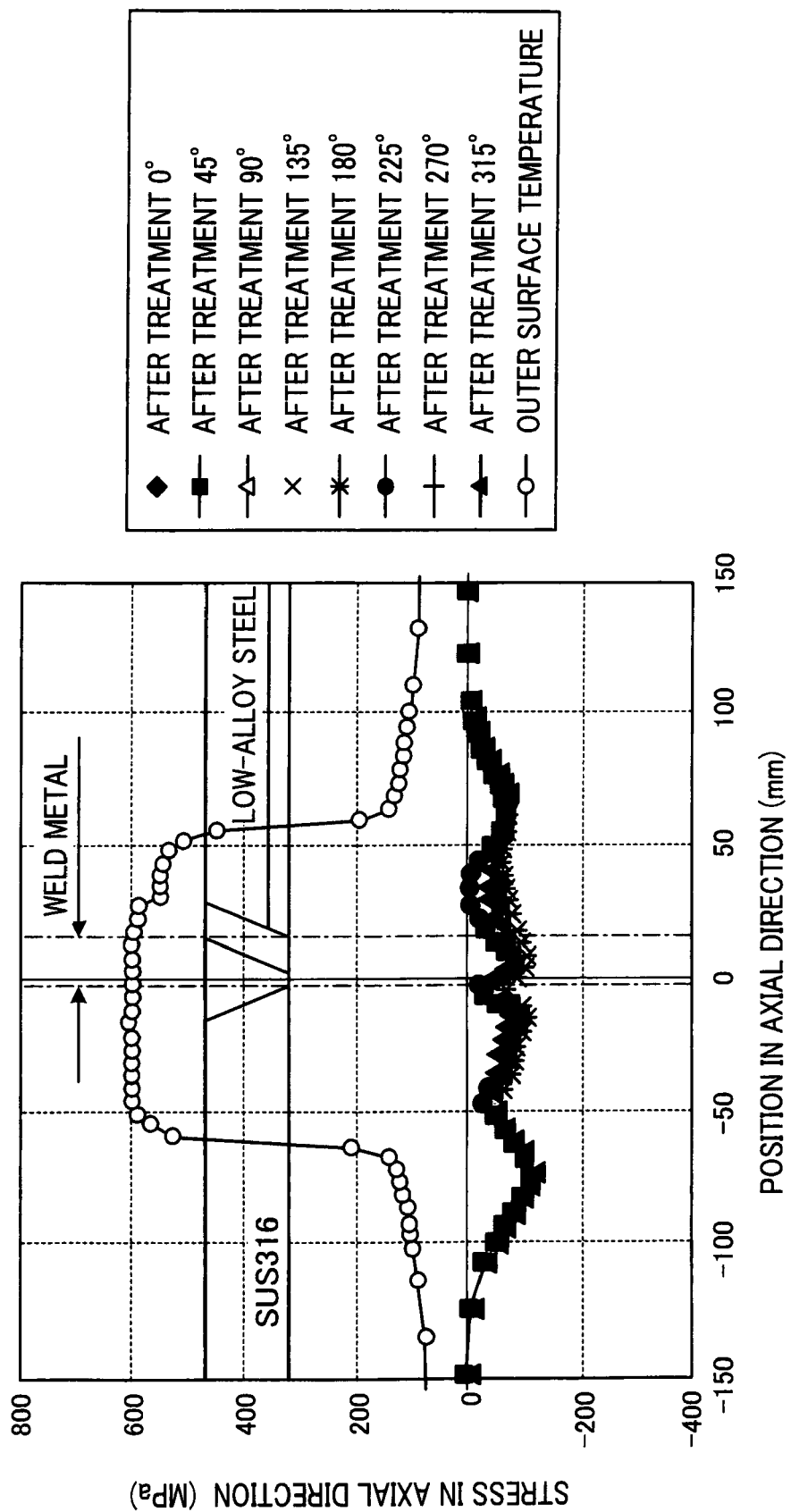

FIGS. 14A and 14B show the residual-stress distribution after the treatment (after the two circling). As FIGS. 14A and 14B show, the inner surface of the nickel-chromium iron alloy weld metal and of the stainless steel (SUS316) has compressive stress all along their circumference.

Embodiment 3

In Embodiments 1 and 2, the effect of improving the residual stress in the air-cooling mode (i.e., in a case where the inside of the pipe is filled with gas or in a case where the inside of the pipe is filled with water before the treatment) has been examined. Subsequently, the effect of improving the residual stress in the water-cooling mode (i.e., in a case where the inside of the pipe is always filled with water) will be examined.

Figure 15:
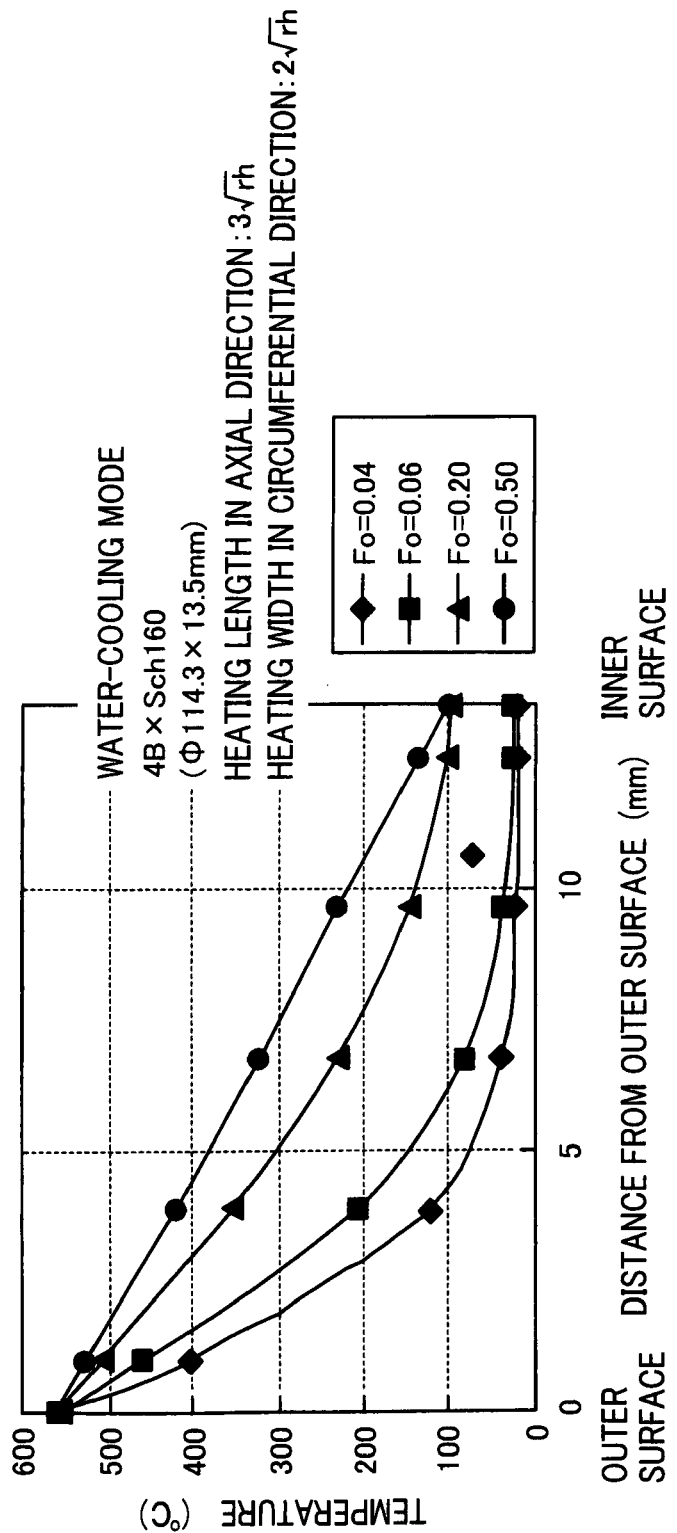
FIG. 15 is a graph illustrating temperature distributions for different values of Fo with respect to the distance from the outer surface when the present invention is used in the water-cooling mode.

As FIG. 15 shows, in the water-cooling mode, even a large Fo value cannot raise the temperature of the inner surface above the boiling point of water (100° C.). Accordingly, it is understandable that even if the laser moves slowly, a large temperature difference between the inner and the outer surfaces can be achieved.

The relationships, in the water-cooling mode, between the thermal stress and the temperature-rising time parameter Fo and between the thermal stress and the heating width W in the circumferential direction were examined each by a thermoelastic analysis.

Figure 16B:
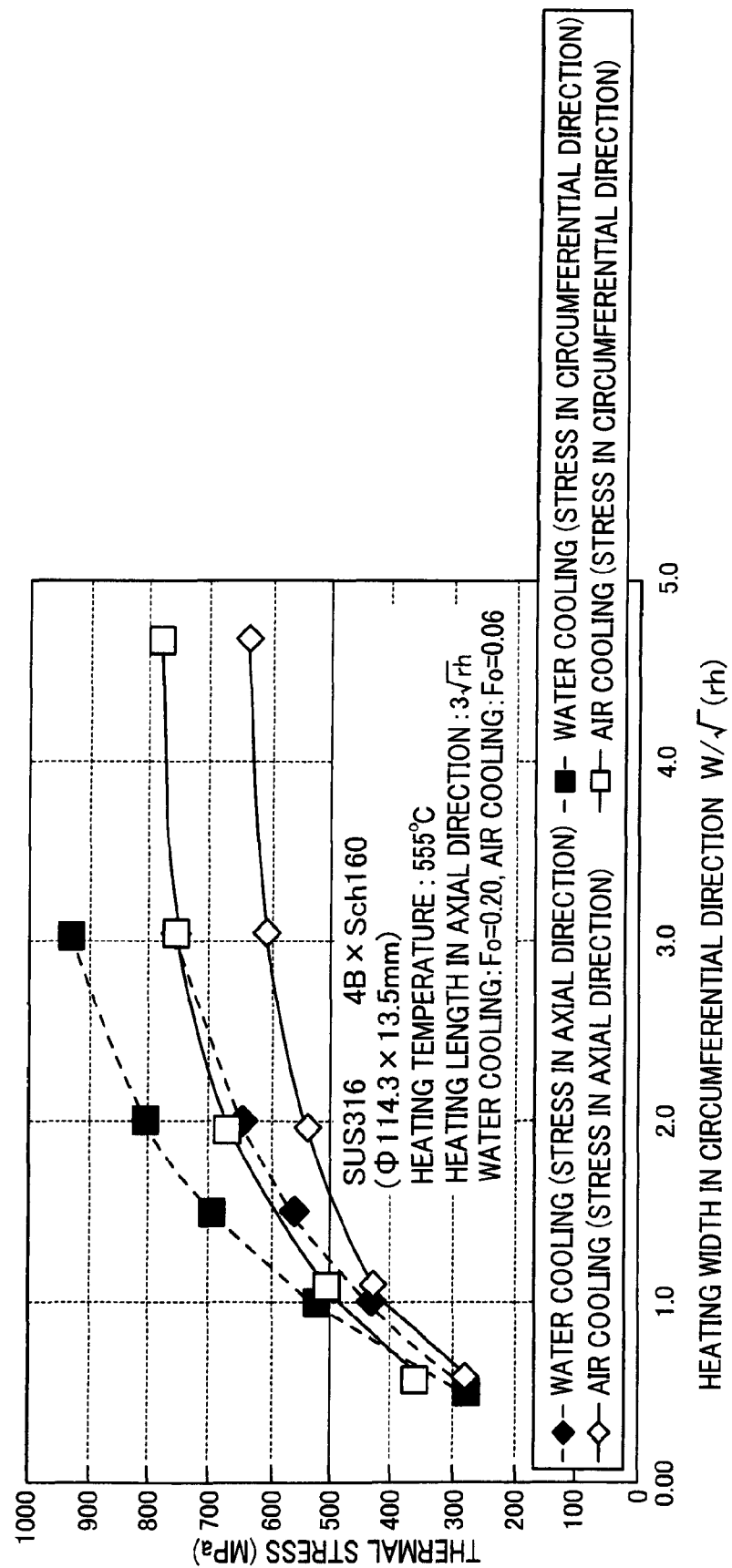
FIG. 16B is a graph illustrating the relationship between the heating width in the circumferential direction and the thermal stress in the water-cooling mode.

The graph shown in FIG. 16A shows the relationship between the temperature-rising time parameter Fo and the thermal stress obtained using the apparatus shown in FIG. 1 under the condition that the parameters other than the temperature-rising time parameter Fo are set at constant values (specifically, the highest achieving temperature Tmax=555° C., the heating length in the axial direction L=3×√(rh), the heating width in the circumferential direction W=2×√(rh)). In addition, the graph shown in FIG. 16B shows the relationship between the heating width W in the circumferential direction and the thermal stress obtained using the apparatus shown in FIG. 1 under the condition that the parameters other than the in-the-circumferential-direction heating-width parameter W/√(rh) are set at constant values (specifically, the temperature-rising time parameter Fo=0.20, the highest achieving temperature Tmax=555° C., and the heating length in the axial direction L=3×√(rh)). Note that the results in the air-cooling mode are also shown in FIGS. 16A and 16B for comparison.

The results shown in FIGS. 16A and 16B demonstrate that, in the water-cooling mode, the ranges of the temperature-rising time parameter Fo and the W/√(rh) are wider than the air-cooling mode, if the same thermal stress is to be obtained. This means that, in the water-cooling mode, wider ranges of treatment conditions can results in a residual-stress improving effect that is equivalent to what is obtainable in the air-cooling mode.

The result of the thermal elastoplastic analysis demonstrates that, even with the same treatment conditions (Tmax, Fo, W, and L), the thermal stress produced in the inner surface in the water-cooling mode is larger. So, using a 4B stainless-steel pipe as an example (Refer Table 4), the difference between the residual-stress improving effect obtainable in the air-cooling mode and that obtainable in the water-cooling mode was examined, under lower-limit conditions with which the temperature-rising time parameter Fo could cause only a small influence. Note that the lower limit of the heating width W in the circumferential direction is 1.7√(rh) in the air-cooling mode, but the analysis was carried out with the heating width in the circumferential direction W=1.0√(rh) for comparison.

TABLE 4

| Case | Air-Cooling Mode (1) | Air-Cooling Mode (2) | Water-Cooling Mode (1) |
|---|---|---|---|
| External Diameter D | | 114.3 mm | |
| Wall Thickness h | | 13.5 mm | |
| Material | | P-8 + P-8 (Weld Metal: F-5) | |
| Air-Cooling/Water-Cooling | Air-Cooling: No Water Exists Inside (Atmosphere Temperature: 50° C.) | | Water-Cooling: Water Exists Inside (Atmosphere Temperature: 50° C.) |
| Highest Achieving Temperature Tmax | | Lower Limit: from 550° C. to 560° C. | |
| Temperature-Rising Time Parameter Fo (Temperature-Rising Time τo) | | Fo = 0.04 (τo = 1.8 s) | |
| Moving Speed v | | v = 14.3 mm/s (vh = 193 mm²/s) | |
| Heating Width in Circumferential Direction W | 1.7 × √(rh) = 44 mm | 1.0 × √(rh) = 26 mm | 1.0 × √(rh) = 26 mm |
| Heating Length in Circumferential Direction L | | Lower Limit: 3.0 × √(rh) = 78 mm | |

Figure 17:
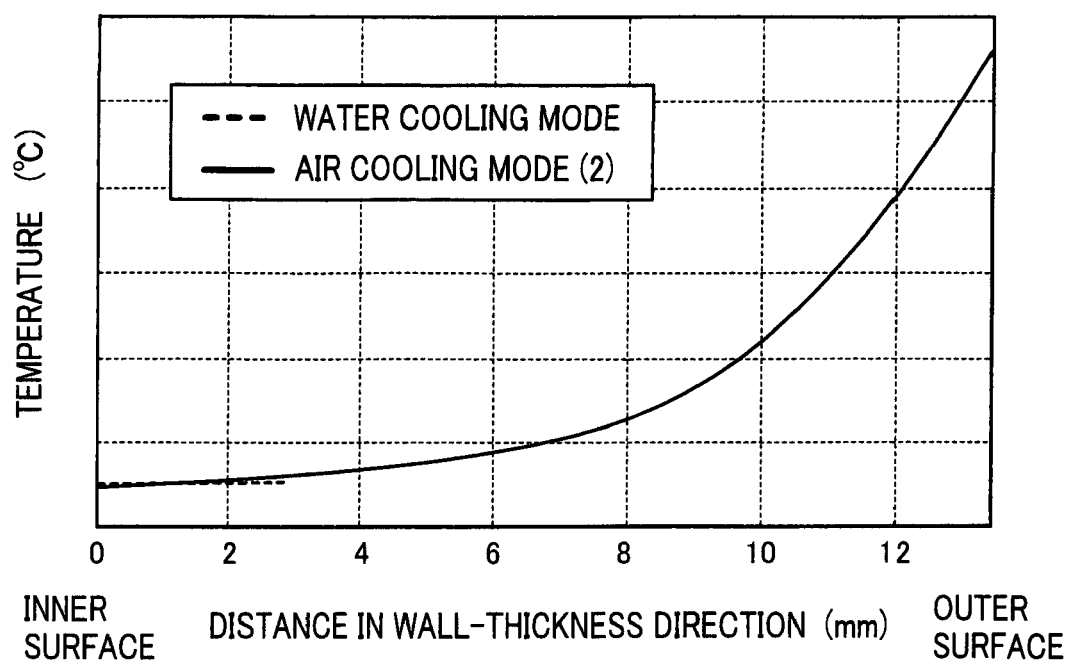
FIG. 17 is a graph for comparing the temperature distributions with respect to the distance from the outer surface, between the air-cooling mode and the water-cooling mode.

The temperature distribution in the wall-thickness direction at the time of the treatment in the air-cooling mode and the corresponding temperature distribution in the water-cooling mode are completely identical to each other under the same treatment conditions. The distributions thus obtained are shown in FIG. 17. There is no difference between the temperature distributions in the wall-thickness direction obtained in the two modes for the following reason. The temperature-rising time parameter Fo in the air-cooling mode was 0.04, which is the same as that in the water-cooling mode. The outer surface reached the highest temperature before the heat reached the inner surface. Thus, the boundary condition at the inner surface did not affect the temperature distribution. Accordingly, it is conceivable that the difference in the stress improving effect between the air-cooling mode and the water-cooling mode may probably have derived from factors other than the temperature distribution in the wall-thickness direction produced as a result of the high-temperature outer surface irradiated with the laser beams.

Figure 18B:
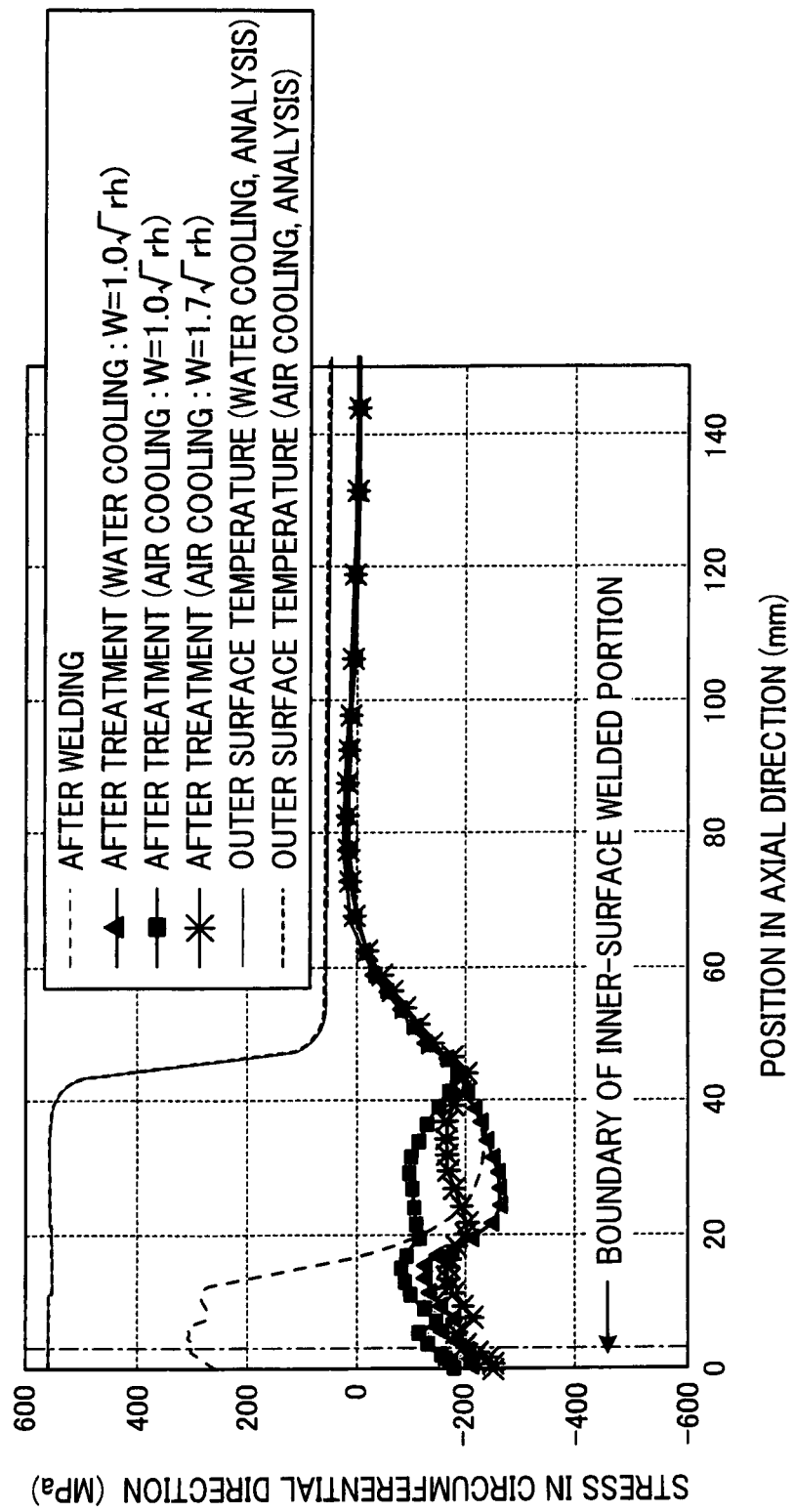

FIGS. 18A and 18B show comparisons between the residual stress after the treatment in the air-cooling mode and in the water-cooling mode.

FIGS. 18A and 18B demonstrate that the effect of improving the residual stress obtainable in the water-cooling mode is larger than the corresponding effect obtainable in the air-cooling mode. For example, with the same heating width in the circumferential direction, the effect of improving the residual stress obtainable in the water-cooling mode is larger than the corresponding effect obtainable in the air-cooling mode. In addition, it can be seen that, in order to obtain, by the stress in the axial direction, a residual-stress improving effect of a level equivalent to what is obtainable in the air-cooling mode, the heating width in the circumferential direction in the water-cooling mode can be lowered from $1.7\sqrt{(rh)}$ down to $1.0\sqrt{(rh)}$.

The major difference between the water-cooling mode and the air-cooling mode is the highest achieving temperature of the inner surface. Specifically, the highest achieving temperature of the inner surface in the water-cooling mode is so low that it may probably be difficult to cause reverse yielding (compressive yielding) to happen when the temperature is lowered. For example, in the air-cooling mode, after the tensile plasticity strain is caused by the temperature in the wall-thickness direction, the temperature difference in the wall-thickness direction disappears. At the time when temperature difference in the wall-thickness direction disappears (the temperature of the inner surface is approximately 200° C., and the yielding stress is 198 MPa), compressive yielding takes place. In contrast, in the water-cooling mode, after the tensile plasticity strain is caused by the temperature in the wall-thickness direction, the temperature difference in the wall-thickness direction disappears. At the time when temperature difference in the wall-thickness direction disappears (the temperature of the inner surface is approximately 100° C., and the yielding stress is 245 MPa), compressive yielding may probably not take place. This may probably be one of the reasons for the larger effect of improving the stress obtainable in the water-cooling mode.

For the reasons above, with respect to the control ranges for the treatment conditions in the water-cooling mode, only the lower limit of the temperature-rising time parameter Fo has to be controlled. The range is preferably not smaller than 0.04. The heating width W in the circumferential direction may be controlled with its lower limit, which is preferably not smaller than $1.0\times\sqrt{(rh)}$. Specifically, in the water-cooling mode, the control range can be made less strict than in the case of the air-cooling mode because water (such as running water or accumulated water) is present inside the pipe at the time of laser irradiation. The water inside the pipe always allows the entire circumference of the pipe to be water-cooled (to be kept at a temperature that is not higher than the boiling temperature).

The control ranges for the treatment conditions in Embodiments 1, 2, and 3 are summarized in Table 5.

TABLE 5

| Mode | Air-Cooling Mode | Water-Cooling Mode |
|---|---|---|
| Condition of Inner Surface | Gas is inside the Pipe or Water is Filled in the Inside before the Treatment | Water is Always Filled in the Inside |
| Highest Achieving Temperature Tmax | Austenitic Stainless Steel: 550° C. ≤ Tmax < 650° C. Nickel-Chromium Iron Alloy: 550° C. ≤ Tmax < 650° C. Low-Alloy Steel: 500° C. ≤ Tmax < 595° C. | Austenitic Stainless Steel: 550° C. ≤ Tmax < 650° C. Nickel-Chromium Iron Alloy: 550° C. ≤ Tmax < 650° C. Low-Alloy Steel: 500° C. ≤ Tmax < 595° C. |
| Temperature-Rising Time Parameter Fo | 0.04 ≤ Fo ≤ 0.08 | 0.04 ≤ Fo |
| Moving Speed v | vh ≥ 70 mm²/s | vh ≥ 15 mm²/s |
| Heating Width in Circumferential Direction W | $1.7\times\sqrt{(rh)} \le W$ | $1.0\times\sqrt{(rh)} \le W$ |
| Heating Length in Axial Direction L | Not Smaller Than $3\sqrt{(rh)}$ | Not Smaller Than $3\sqrt{(rh)}$ |

INDUSTRIAL APPLICABILITY

The cylindrically-shaped pipes subjected to the residual stress improvement in the above embodiments are used just as examples. The present invention is applicable not only to the cylindrically-shaped pipes, but to any welded curved member.

The invention claimed is:

1. A tubular-body residual-stress improving method for improving residual stress of a cylindrical tubular body by locally irradiating an outer-circumferential surface of a welded portion of the tubular body with laser beams and by moving an irradiation area in a circumferential direction, wherein,
   a plurality of thermometers are installed on a tubular body to be improved;
   a temperature history of an outer surface of the tubular body is measured by the plurality of thermometers while the outer surface is irradiated with the laser beams;
   a highest achieving temperature, a temperature-rising time required for reaching the highest achieving temperature, and a heating length in an axial direction in which the highest achieving temperature stays in a predetermined temperature range are obtained; and
   a heating width in the circumferential direction is controlled on the basis of a product of the temperature-rising time and a speed of moving the laser beams in the circumferential direction.

2. A tubular-body residual-stress improving method for improving residual stress of a cylindrical tubular body by locally irradiating an outer-circumferential surface of a welded portion of the tubular body with laser beams and by moving an irradiation area in a circumferential direction, wherein,
   preliminarily, a plurality of thermometers are installed on a different tubular body having a same condition as that of a tubular body to be improved,
   a temperature history of an outer surface of the different tubular body is measured by the plurality of thermometers while the outer surface is irradiated with the laser beams; a highest achieving temperature, a temperature-rising time required for reaching the highest achieving temperature, and a heating length in an axial direction in which the highest achieving temperature stays in a predetermined temperature range are obtained; then a heating width in the circumferential direction is obtained on the basis of a product of the temperature-rising time and a speed of moving the laser beams in the circumferential direction, and subsequently, when the tubular body to be improved is irradiated with the laser beams, the highest achieving temperature, the temperature-rising time, the heating length in the axial direction, and the heating width in the circumferential direction are controlled as treatment conditions.

3. The tubular-body residual-stress improving method according to claim 1 or 2, wherein a dimensionless time $F=(\tau \times k)/h^2$ is obtained, where $\tau$ is the temperature-rising time, k is a thermal diffusivity of the tubular body, and h is a wall thickness of the tubular body, and the dimensionless time F is controlled as the temperature rising time.

4. The tubular-body residual-stress improving method according to claim 3, wherein the dimensionless time F is controlled with an upper limit and a lower limit thereof.

5. The tubular-body residual-stress improving method according to claim 1 or 2, wherein a dimensionless distance in the circumferential direction $G=W/\sqrt{(rh)}$ is obtained, where W is the heating width in the circumferential direction, r is an average radius of the tubular body, and h is the wall thickness of the tubular body, and the dimensionless distance G is controlled as the heating width in the circumferential direction.

6. The tubular-body residual-stress improving method according to claim 5, wherein a lower limit of the dimensionless distance G is controlled.

7. The tubular-body residual-stress improving method according to claim 1 or 2, wherein a dimensionless distance in the axial direction $J=L/\sqrt{(rh)}$ is obtained, where L is the heating length in the axial direction, r is the average radius of the tubular body, and h is the wall thickness of the tubular body, and the dimensionless distance J is controlled as the heating length in the axial direction.

8. The tubular-body residual-stress improving method according to claim 7, wherein the dimensionless distance J is controlled to be not less than 3.0.

9. The tubular-body residual-stress improving method according to claim 1 or 2, wherein the highest achieving temperature is controlled:

to be not lower than 550° C. and lower than 650° C. in a case where the tubular body is made of an austenitic stainless steel;

to be not lower than 550° C. and lower than 650° C. in a case where the tubular body is made of a nickel-chromium iron alloy; and to be not lower than 500° C. and lower than 595° C. in a case where the tubular body is made of any one of a low-alloy steel and a carbon steel.

10. The tubular-body residual-stress improving method according to claim 1 or 2, wherein a product (v×h) is controlled to be not less than 70 mm²/s, where v is the moving speed of the laser beams and h is the wall thickness of the tubular body.

11. The tubular-body residual-stress improving method according to claim 3, wherein a lower limit of the dimensionless time F is controlled in a case where an inner surface of the tubular body is cooled by water.

12. The tubular-body residual-stress improving method according to claim 6, wherein a lower limit of the dimensionless distance G is controlled in a case where an inner surface of the tubular body is cooled by water.

13. A tubular-body residual-stress improving apparatus including:

rotationally driving means which moves circling around an outer circumference of a cylindrical tubular body and whose speed of moving in a circumferential direction can be controlled;

an optical head which is held by the rotationally driving means, the optical head locally irradiating an outer-circumferential surface of a welded portion of the tubular body with laser beams, and being capable of adjusting an irradiation area; and regulating means which regulates the rotationally moving means and the optical head, and the apparatus improving residual stress of the tubular body by making the irradiation area of the laser beams move in the circumferential direction, wherein a plurality of thermometers are installed on a tubular body to be improved, and the regulating means:

makes the plurality of thermometers measure a temperature history of an outer surface of the tubular body while the outer surface is irradiated with the laser beams;

obtains a highest achieving temperature, a temperature-rising time required for reaching the highest achieving temperature, and a heating length in an axial direction in which the highest achieving temperature stays within a predetermined temperature range; and controls a heating width in the circumferential direction on the basis of a product of the temperature-rising time and a speed of moving the laser beams in the circumferential direction.

14. A tubular-body residual-stress improving apparatus including:

rotationally driving means which moves circling around an outer circumference of a cylindrical tubular body and whose speed of moving in a circumferential direction can be controlled;

an optical head which is held by the rotationally driving means, the optical head locally irradiating an outer-circumferential surface of a welded portion of the tubular body with laser beams, and being capable of adjusting an irradiation area; and regulating means which regulates the rotationally moving means and the optical head, and the apparatus improving residual stress of the tubular body by making the irradiation area of the laser beams move in the circumferential direction, wherein preliminarily, a plurality of thermometers are installed on a different tubular body having a same condition as that of a tubular body to be improved, and the regulating means:

makes the plurality of thermometers measure a temperature history of an outer surface of the different tubular body while the outer surface is irradiated with the laser beams;

obtains a highest achieving temperature, a temperature-rising time required for reaching the highest achieving temperature, and a heating length in an axial direction in which the highest achieving temperature stays within a predetermined temperature range; and obtains a heating width in the circumferential direction on the basis of a product of the temperature-rising time and a speed of moving the laser beams in the circumferential direction, and subsequently, when the tubular body to be improved is irradiated with the laser beams, the regulating means controls the highest achieving temperature, the temperature-rising time, the heating length in the axial direction, and the heating width in the circumferential direction as treatment conditions.

15. The tubular-body residual-stress improving apparatus according to claim 13 or 14, wherein the regulating means obtains a dimensionless time $F=(\tau \times k)/h^2$, where $\tau$ is the temperature-rising time, k is a thermal diffusivity of the tubular body, and h is a wall thickness of the tubular body, and the regulating means controls the dimensionless time F as the temperature rising time.

16. The tubular-body residual-stress improving apparatus according to claim 15, wherein the regulating means controls the dimensionless time F with an upper limit and a lower limit thereof.

17. The tubular-body residual-stress improving apparatus according to claim 13 or 14, wherein the regulating means obtains a dimensionless distance in the circumferential direction $G=W/\sqrt{(rh)}$, where W is the heating width in the circumferential direction, r is an average radius of the tubular body, and h is the wall thickness of the tubular body, and the regulating means controls the dimensionless distance G as the heating width in the circumferential direction.

18. The tubular-body residual-stress improving apparatus according to claim 17, wherein the regulating means controls a lower limit of the dimensionless distance G.

19. The tubular-body residual-stress improving apparatus according to claim 13 or 14, wherein the regulating means obtains a dimensionless distance in the axial direction $J=L/\sqrt{(rh)}$ where L is the heating length in the axial direction, r is the average radius of the tubular body, and h is the wall thickness of the tubular body, and the regulating means controls the dimensionless distance J as the heating length in the axial direction.

20. The tubular-body residual-stress improving apparatus according to claim 19, wherein the regulating means controls the dimensionless distance J so that the dimensionless distance J is not less than 3.0.

21. The tubular-body residual-stress improving apparatus according to claim 13 or 14, wherein the regulating means controls the highest achieving temperature:

so that the highest achieving temperature is not lower than 550° C. and lower than 650° C. in a case where the tubular body is made of an austenitic stainless steel;

so that the highest achieving temperature is not lower than 550° C. and lower than 650° C. in a case where the tubular body is made of a nickel-chromium iron alloy; and so that the highest achieving temperature is not lower than 500° C. and lower than 595° C. in a case where the tubular body is made of any one of a low-alloy steel and a carbon steel.

22. The tubular-body residual-stress improving apparatus according to claim 13 or 14, wherein the regulating means controls a product (v×h) so that the product is not less than 70 mm²/s, where v is the moving speed of the laser beams and h is the wall thickness of the tubular body.

23. The tubular-body residual-stress improving apparatus according to claim 15, wherein the regulating means controls a lower limit of the dimensionless time F in a case where an inner surface of the tubular body is cooled by water.

24. The tubular-body residual-stress improving apparatus according to claim 17, wherein the regulating means controls a lower limit of the dimensionless distance G in a case where an inner surface of the tubular body is cooled by water.

* * * * *